(12) United States Patent
Liu et al.

(10) Patent No.: US 12,013,483 B2
(45) Date of Patent: Jun. 18, 2024

(54) CALIBRATION DEVICE FOR VEHICLE ADVANCED DRIVER ASSISTANT SYSTEM

(71) Applicant: SHENZHEN SMARTSAFE TECH CO., LTD., Guangdong (CN)

(72) Inventors: Jun Liu, Guangdong (CN); Xinwei Xu, Guangdong (CN)

(73) Assignee: SHENZHEN SMARTSAFE TECH CO., LTD., Shenzhen (CN)

( * ) Notice: Subject to any disclaimer, the term of this patent is extended or adjusted under 35 U.S.C. 154(b) by 681 days.

(21) Appl. No.: 17/267,403

(22) PCT Filed: Sep. 30, 2020

(86) PCT No.: PCT/CN2020/119560
§ 371 (c)(1),
(2) Date: Feb. 9, 2021

(87) PCT Pub. No.: WO2022/067727
PCT Pub. Date: Apr. 7, 2022

(65) Prior Publication Data
US 2022/0236373 A1    Jul. 28, 2022

(51) Int. Cl.
*G01S 7/40* (2006.01)
*F16M 11/24* (2006.01)
(Continued)

(52) U.S. Cl.
CPC .............. *G01S 7/40* (2013.01); *F16M 11/24* (2013.01); *F16M 11/28* (2013.01); *F16M 11/38* (2013.01);
(Continued)

(58) Field of Classification Search
CPC ......... G01S 7/40; G01S 13/931; F16M 11/24; F16M 11/28; F16M 11/38; F16M 11/42;
(Continued)

(56) References Cited

U.S. PATENT DOCUMENTS

| 4,317,552 A | 3/1982 | Weidler |
| 5,125,164 A * | 6/1992 | Fournier ................ G01B 11/27 |
| | | 33/608 |

(Continued)

FOREIGN PATENT DOCUMENTS

| CN | 101660652 A | 3/2010 |
| CN | 105953055 A | 9/2016 |

(Continued)

OTHER PUBLICATIONS

The extended European search report issued in EP20848833.8, dated Feb. 25, 2022.

*Primary Examiner* — Marrit Eyassu
(74) *Attorney, Agent, or Firm* — HSML P.C.

(57) ABSTRACT

The present disclosure discloses a calibration device for a vehicle Advanced Driver Assistant System, the calibration device includes: a foldable base (1), a stand assembly (2) and a beam assembly (3); the foldable base (1) including a bearing seat (11) and a plurality of bearing arms (12) rotatably arranged on the bearing seat (11), the stand assembly (2) is disposed on the bearing seat (11); the bearing arms (12) are able to be folded relative to the bearing seat (11) in a direction approaching the stand assembly (2); the beam assembly (3) is disposed on a top of the stand assembly (2) and includes two foldable beams (32). The calibration device for the vehicle ADAS can be folded when it is not in use, so that it occupy a smaller space and is convenient to carry, thereby facilitating its storage and transportation.

17 Claims, 17 Drawing Sheets

(51) Int. Cl.
*F16M 11/28* (2006.01)
*F16M 11/38* (2006.01)
*F16M 11/42* (2006.01)
*G01S 13/931* (2020.01)

(52) U.S. Cl.
CPC ........... *F16M 11/42* (2013.01); *G01S 13/931* (2013.01); *F16M 2200/024* (2013.01); *F16M 2200/066* (2013.01)

(58) Field of Classification Search
CPC ....... F16M 2200/024; F16M 2200/066; F16M 11/045; F16M 11/242; F16M 11/041; F16M 11/18; F16M 11/04; F16M 11/10; F16M 11/16; G01D 11/30; G01D 18/00
USPC .......................................................... 73/1.01
See application file for complete search history.

(56) References Cited

U.S. PATENT DOCUMENTS

2019/0187249 A1* 6/2019 Harmer .................... G01S 7/40
2020/0271267 A1* 8/2020 Govekar ................ G01B 11/00

FOREIGN PATENT DOCUMENTS

| CN | 210219204 U | | 3/2020 | |
|---|---|---|---|---|
| CN | 210514607 U | * | 5/2020 | |
| CN | 210514607 U | | 5/2020 | |
| CN | 111336364 A | * | 6/2020 | ............ F16M 11/04 |
| CN | 111520594 A | | 8/2020 | |
| CN | 111520595 A | | 8/2020 | |
| DE | 102017223724 A1 | * | 7/2018 | ......... G01B 11/2755 |
| WO | 2008038398 A1 | | 4/2008 | |
| WO | 2015001138 A1 | | 1/2015 | |

* cited by examiner

CALIBRATION DEVICE FOR VEHICLE ADVANCED DRIVER ASSISTANT SYSTEM

TECHNICAL FIELD

The present disclosure relates to the technical field of vehicle maintenance and calibration device, and more particularly to a calibration device for a vehicle ADAS (Advanced Driver Assistant System).

BACKGROUND

Advanced Driver Assistant System, abbreviated as ADAS, uses a variety of sensors installed on a vehicle to collect environmental data inside and outside the vehicle at the first time to perform technical processing such as identification, detection and tracking of dynamic and static objects, so that a driver can be aware of possible dangers in a fastest time, in order to attract attention and improve safety and active safety technology.

At present, the sensors used in ADAS mainly include cameras, radars, lasers and ultrasonics, etc., which can detect light, heat, pressure or other variables used to detect the state of the vehicle, and are usually located inside of a front and rear bumpers, side mirrors and steering column, or on the windshield. During the use of the vehicle, vibration, collision, environmental temperature and humidity, etc. would change the physical installation status of the above-mentioned sensors, and therefore need to be adjusted or calibrated irregularly.

Since the irregular adjustment or calibration of the vehicle ADAS may be carried out indoors (performed in maintenance shop) or outdoors. However, the existing ADAS calibration devices occupy a large space and are inconvenient to carry due to their own structure. As a result, the related calibration operations of the ADAS calibration device cannot be performed outdoors or the operation is difficult, which waste time and energy.

Therefore, how to design a portable ADAS calibration device has become an urgent problem to be solved.

SUMMARY

One of objects of embodiments of the present disclosure is to provide a calibration device for a vehicle ADAS, in order to solve the technical problem that the calibration device occupy a large space.

In order to solve above-mentioned technical problem, an embodiment of the present disclosure adopts the technical scheme is:

providing a calibration device for a vehicle Advanced Driver Assistant System, comprising:

a foldable base, comprising a bearing seat and a plurality of bearing arms rotatably arranged on the bearing seat;

a stand assembly, disposed on the bearing seat, wherein the bearing arms are able to be folded relative to the bearing seat in a direction approaching the stand assembly; and a beam assembly, disposed on a top of the stand assembly and comprising two foldable beams.

The beneficial effect of the calibration device for the vehicle ADAS provided by the embodiment of the present disclosure is that the bearing arms of the foldable base can be turned over relative to the bearing seat and stays in the current position stably, the beams can also be turned from a horizontal direction to a vertical direction, and the bearing arms can be turned over relative to the beam, such that the calibration device for the vehicle ADAS can be folded when it is not in use, so that it occupies a small space and is convenient to carry, thereby facilitating its storage and transportation.

BRIEF DESCRIPTION OF THE DRAWINGS

In order to explain the embodiments of the present disclosure more clearly, a brief introduction regarding the accompanying drawings that need to be used for describing the embodiments of the present disclosure or the prior art is given below; it is obvious that the accompanying drawings described as follows are only some embodiments of the present disclosure, for those skilled in the art, other drawings can also be obtained according to the current drawings on the premise of paying no creative labor.

DETAILED DESCRIPTION

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

In order to illustrate the technical solutions provided by the present disclosure, detailed descriptions are given below in conjunction with specific drawings and embodiments.

Embodiment 1

Figure 1:
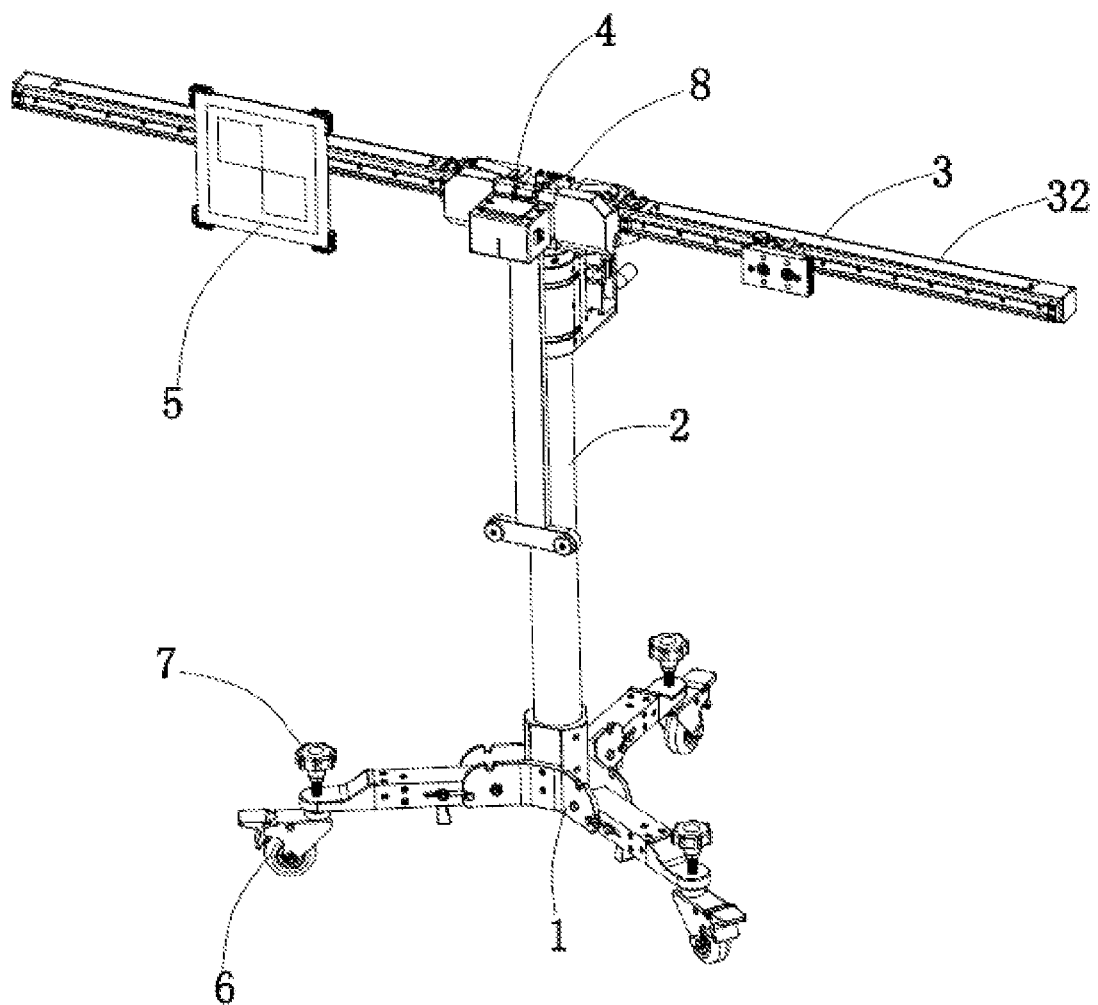
FIG. 1 is a schematic view of an overall structure of a calibration device for a vehicle ADAS provided with a small target plate installed in an embodiment of the present disclosure.
Figure 2:
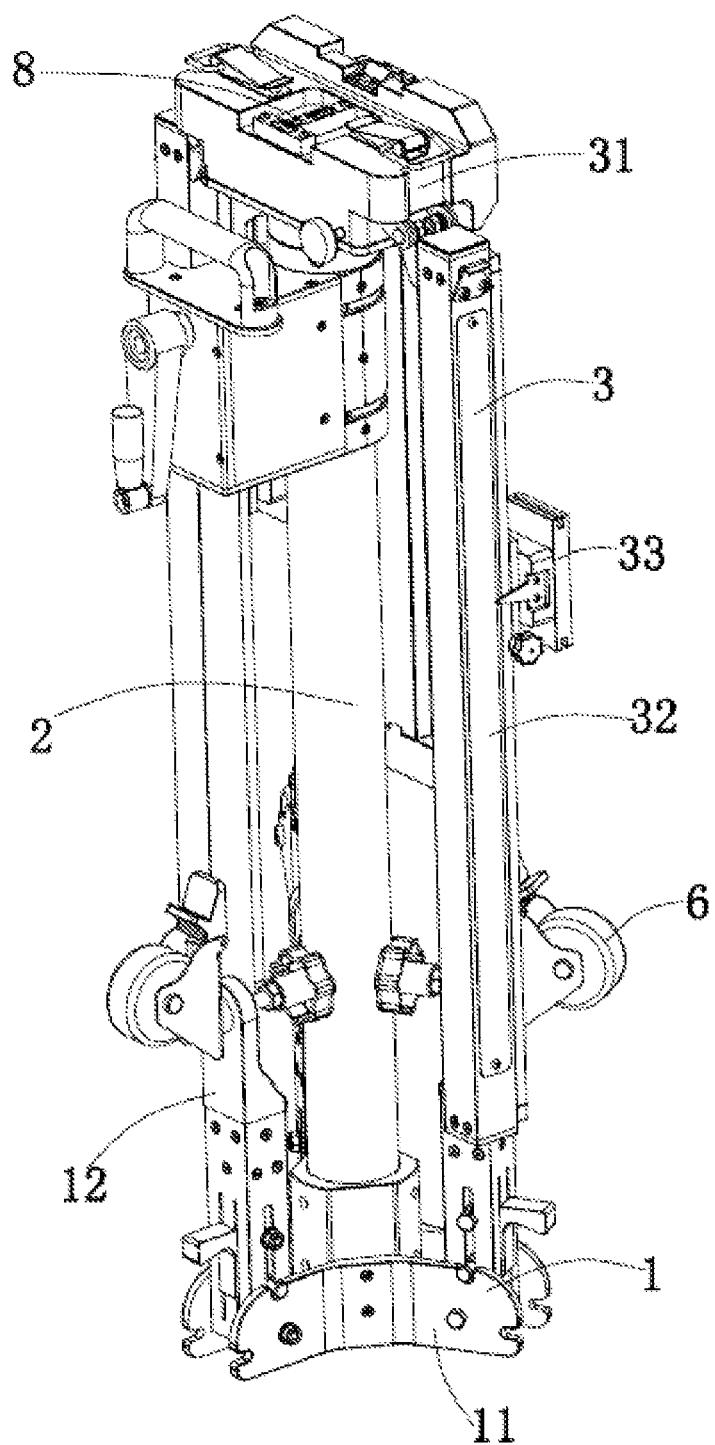
FIG. 2 is a schematic view of an overall structure of a calibration device for a vehicle ADAS provided by an embodiment of the present disclosure after being folded and stored.
Figure 3:
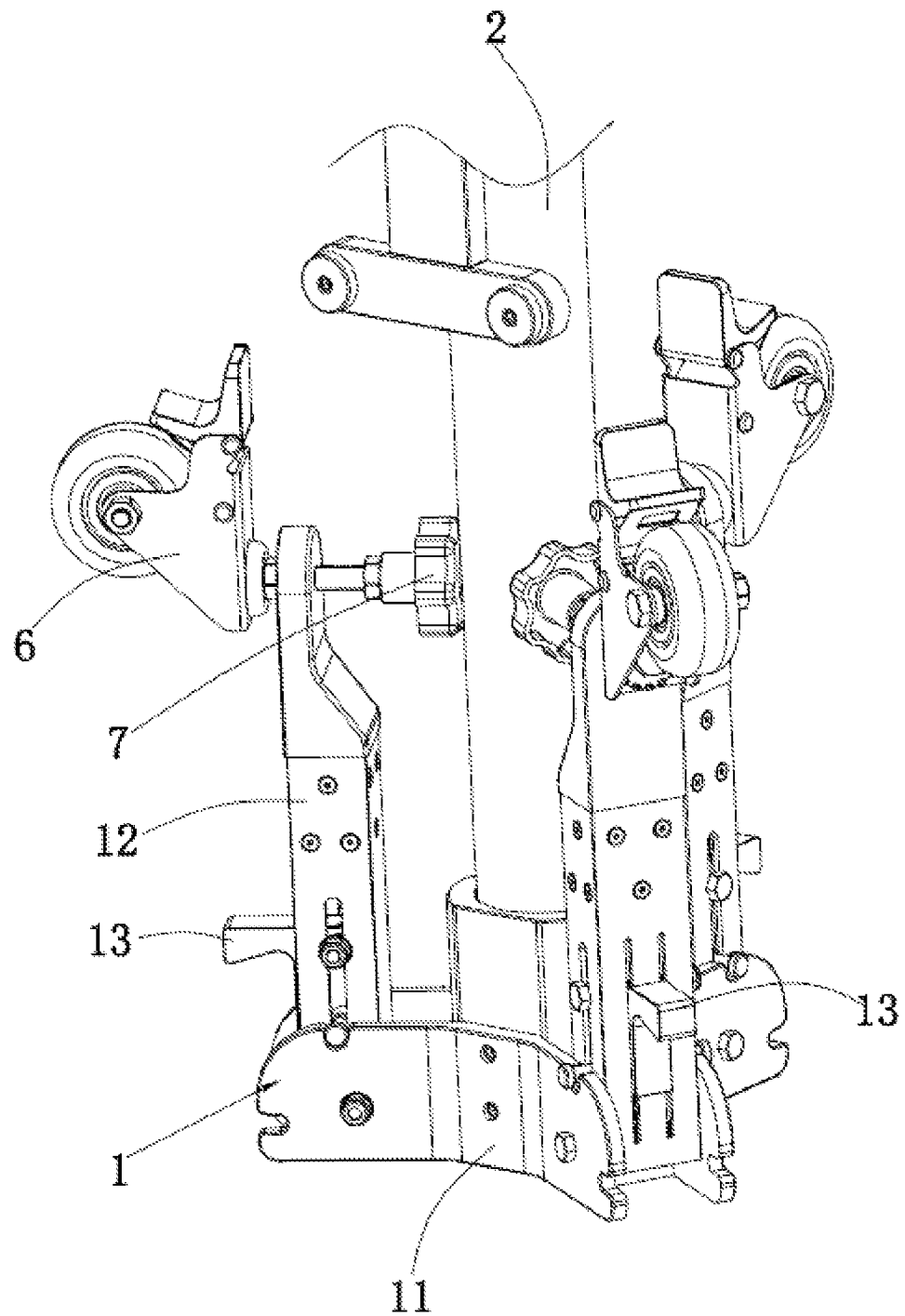
FIG. 3 is a schematic view of a folded foldable base in a calibration device for a vehicle ADAS provided by an embodiment of the present disclosure.

As shown in FIGS. 1 to 3, a calibration device for a vehicle ADAS provided by an embodiment of the present disclosure will now be described. The calibration device includes foldable base 1, a stand assembly 2, a beam assembly 3, a laser 4 and target plates 5.

Among them, the foldable base 1 is configured to bear and realize the movement and location of the calibration device. The foldable base 1 includes a bearing seat 11 and a plurality of bearing arms 12 rotatably disposed onto the bearing seat 11; the stand assembly 2 is installed on the foldable base 1 and configured to support the beam assembly 3 so as to realize the height adjustment of the beam assembly 3. In a preferred situation, the bearing arms 12 are folded toward the stand assembly 2 relative to the bearing seat 11; the beam assembly 3 is configured to mount the target plates 5 and laser 4. The beam assembly 3 is arranged onto the top of the stand assembly 2. The beam assembly 3 includes two foldable beams 32. The beam 32 is also folded in a direction adjacent to the stand assembly 2. The beams 32 and the bearing arms 12 are folded relative to a folding direction which taking the middle of the stand assembly 2 as reference point. The laser 4 is disposed on the beam assembly 3 and is located on the symmetry line of the two beams 32. The laser 4 is configured to locate the position of the calibration device. As shown in FIG. 1 and FIG. 2, in the present embodiment, when in a work situation, the foldable base 1 is folded; when out of work, the foldable base 1 is unfolded to reduce the space occupied by the foldable base 1 during storing. The beam assembly 3 is also be folded to reduce the beam assembly 3 occupying the space when storing, so as to facilitate the calibration device to be carried.

Embodiment 2

In the present embodiment, based on the above-mentioned embodiment 1, the specific structure of the foldable base 1 is described in detail as shown in FIGS. 1 to 6.

Specifically, the foldable base 1 includes a bearing seat 11 and a plurality of bearing arms 12 rotatably arranged on the bearing seat 11. There are three bearing arms 12 which are arranged at intervals of equal angles with the bearing seat 11 as the center. An end of each of the bearing arms 12 away from the bearing seat 11 is provided with a traveling wheel 6 a height adjusting member 7. The traveling wheels 6 are configured to realize the movement of the calibration device for the vehicle ADAS during the positioning process, making it convenient to be adjusted. The height adjusting member 7 is configured to adjust the height of the foldable base 1 from the ground and the level of the foldable base 1, so that the foldable base 1 is suitable for uneven ground and the ground having obstacles. In other embodiments, the bearing arms 12 are detachably installed on the bearing seat 11. When the foldable base is stored, the bearing arms 12 can be detached from the bearing seat 11, and then attached to the bearing seat 11 for placement.

Specifically, the stand assembly 2 is arranged at the center of the bearing seat 11 and extend vertically, which make the center of gravity of the calibration device for the vehicle ADAS being on the bearing seat 11. The stability and levelness of foldable base 1 in an unfold situation can be ensured by the three bearing arms 12 because of the stability theorem of the triangle formed, it can ensure.

Specifically, as shown in FIGS. 1 and 3, the bearing arms 12 can be folded relative to the bearing seat 11 in a direction adjacent to the stand assembly 2. Specifically, the extension direction of the bearing arm 12 can be reversed from the horizontal direction to the vertical direction, and a locking assembly 13 that limits the folding angle of the bearing arm 12 is provided at the rotational connection of each of the bearing arms 12 and the bearing seat 11. The locking assembly 13 is configured to ensure the firmness of the bearing arm 12 in the unfolded and folded storage state. The bearing arms 12 are in an unfold situation when The bearing arms 12 extend horizontally, as the traveling wheels 6 are in touch with the ground to make the foldable base 1 bearing the load; while the bearing arms 12 are in a fold situation when The bearing arms 12 extend vertically, with a small storage space for the foldable base 1, which is convenient for storage and transportation and makes it easy to carry. In order to explain in more detail, the horizontal direction refers to the left-right direction in the figures, and the vertical direction refers to the up-down direction in the figures.

Figure 4:
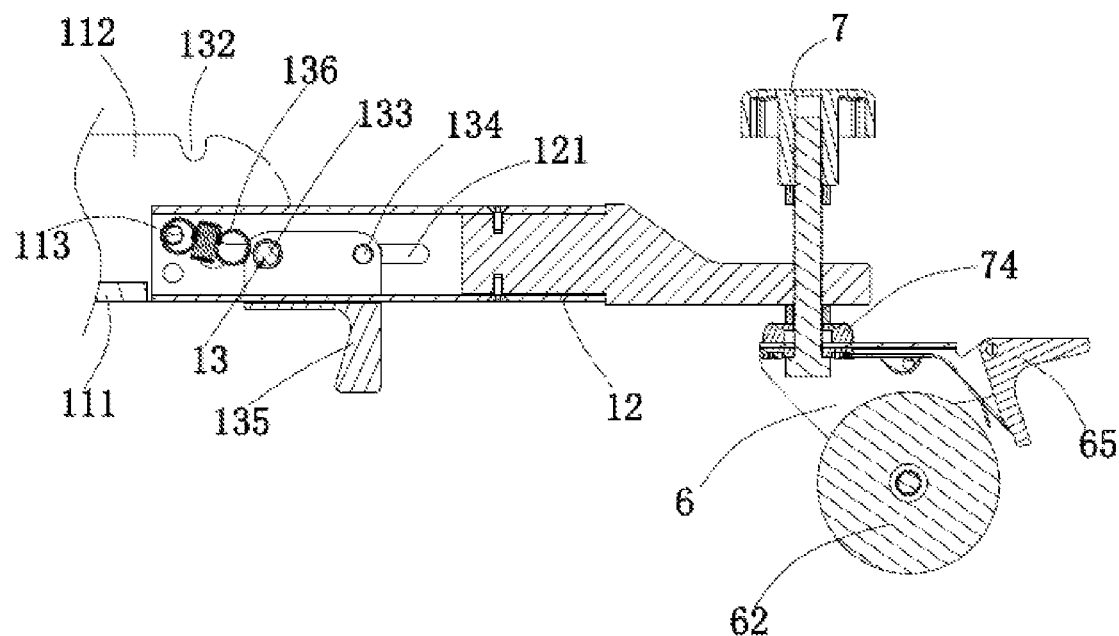
FIG. 4 is a schematic view of a partial cross-sectional structure of a foldable base in a calibration device for a vehicle ADAS provided by an embodiment of the present disclosure.
Figure 5:
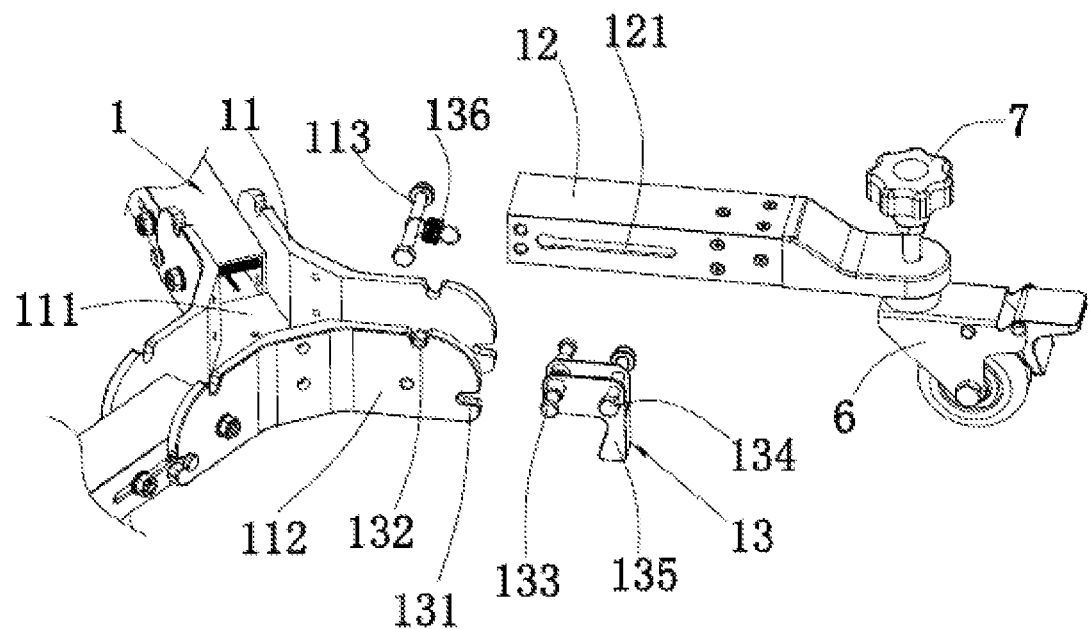
FIG. 5 is a schematic view of a partial exploded structure of a foldable base in a calibration device for a vehicle ADAS provided by an embodiment of the present disclosure.

As shown in FIGS. 3 to 5, the bearing seat 11 includes a bearing plate 111 and baffles 112 surrounding the bearing plate 111. The baffles 112 are provided with three and are distributed in a triangle shape. The baffles 112 are curved plates and there is a gap between same ends of each two adjacent baffles 112, and one end of each bearing arms 12 is arranged in the gap between the two baffles 112 through a first rotating shaft 113.

As shown in FIGS. 3 to 5, the locking assembly 13 includes a first locking hole 131 and a second locking hole 132 arranging on the baffle 112, and a locking member 133 arranging on the bearing arm 12. When the locking member 133 is in the first locking hole, the bearing arm extends in the horizontal direction, and the bearing arm 12 is in the unfolded state; when the locking member 133 is in the second locking hole 132, the bearing arm 12 extends in the vertical direction, and the bearing arm 12 is in the folded state.

Specifically, as shown in FIGS. 3 to 5, the first locking hole 131 is a first groove formed on the baffle 112, the second locking hole 132 is a second groove formed on the baffle 112, and a first opening of the first groove faces the horizontal direction, and a first opening of the second groove faces the vertical direction, and the locking member 133 is a locking rod that is slidably arranged on the bearing arm 12 and can be respectively engaged with the first groove and the second groove. When the locking rod is engaged in the first groove, the bearing arm 12 extends horizontally, and when the locking rod is engaged in the second groove, the bearing arm 12 extends vertically. The locking rod is slidingly set on the bearing arm 12, to make the locking rod can be separated from the first groove or the second groove, so that the bearing arm 12 can rotate. In other embodiments, the first locking hole 131 and the second locking hole 132 are formed by the first through hole and the second through hole spaced apart from the first rotating shaft 113, and the connection line between the first through hole and the first rotating shaft 113 is a horizontal line, while the connecting line between the second through hole and the first rotating shaft 113 is a vertical line. The locking member 133 is a bolt that can pass through the first through hole or the second through hole respectively. The bolt is configured to cooperate with the first rotating shaft 113 to limit the bearing arm 12 from rolling-over.

As shown in FIGS. 3 to 5, the bearing arms 12 are hollow columns, each of which can be a hollow square column or a hollow cylinder. the bearing arm 12 is provided with a sliding slot 121, which is disposed on the side wall of the bearing arm 12, a second rotating shaft 134 is slidably disposed in the sliding slot 121, and the second rotating shaft 134 is provided with a sliding handle 135, which the locking rod is installed on. The sliding handle 135 is slidable along a longitudinal direction of the sliding slot 121 under the action of external force to drive the locking rod engaged into or out of the first groove and second groove. The sliding handle 135 is L-shaped, the bottom wall of the bearing arm 12 is provided with a first slot, a part of the sliding handle 135 is inserted into the bearing arm 12 through the first slot and arranged on the second rotating shaft 134, wherein a part of the locking rod is arranged on the sliding handle 135 and extends out of the bearing arm 12 through the sliding slot 121, so that the part of the locking rod that extends out of the bearing arm 12 is engaged in the first groove or the second groove. The function of the sliding handle 135 is to facilitate the operation of the equipment user to drive the locking rod to move. In a preferred embodiment, the first groove and the second groove are both semi-circular grooves. In this case, the locking rod is a cylindrical rod with a circular cross section. In other embodiments, the first groove and the second groove are both polygonal, such as triangle grooves, square grooves, etc., correspondingly, the cross-sectional shape of the locking rod is a triangular prism rod or a square rod that matches the first groove and the second groove.

As shown in FIGS. 3 to 5, the locking assembly 13 also includes an elastic reset member 136. In a natural state, the elastic reset member 136 drives the locking rod to be engaged into the first groove or the second groove. The purpose of setting the elastic reset member 136 is to ensure the continuous engaging of the locking rod in the first groove or the second groove, and to ensure the stability of the engaging effect of the locking rod.

Specifically, as shown in FIGS. 3 to 5, the elastic reset member 136 is a tension spring, one end of the tension spring is sleeved on the first rotating shaft 113, the other end of the tension spring is sleeved on the locking rod, and the tension spring is located inside the bearing arm 12. The tension spring is in a stretched state in a natural state and pulls the locking rod to move in the direction of being locked into the first groove or the second groove. Of course, one end of the tension spring can also be connected to the baffle 112, and the other end of the tension spring can be connected to the second rotating shaft 134 or sliding handle 135. The number of tension springs can be set to two or more, as long as it can ensure that the locking rod does not detach from the first groove or the second groove without being subjected to external force, that is, during normal transportation or movement, the received vibration force will not cause the locking rod to detach from the first groove or the second groove.

In other embodiments, the elastic reset member 136 is a spring, one end of the spring is disposed on the bearing arm 12, and the other end of the spring abuts on the locking rod. The spring is in a compressed state in a natural state and drives the locking rod to move in the direction of being locked into the first groove or the second groove. Alternatively, one end of the spring is fixed on the bearing arm 12, and the other end abuts on the second rotating shaft 134. Among them, the natural state means that after the locking rod is engaged in the first groove or the second groove, the tension spring is still in a stretched state, and the spring is still in a compressed state, so as to continuously provide tension or elasticity to ensure the stability of the locking rod being engaged to the first groove or the second groove.

As shown in FIGS. 4 and 5, the edge of the baffle 112 between the first groove and the second groove is an arc-shaped edge. The arc-shaped edge is convenient for the locking rod to slide from the first groove along the arc-shaped edge to the second groove for the user save energy.

Embodiment 3

In the present embodiment, on the basis of the foregoing embodiment 1 and embodiment 2, as shown in FIGS. 1 to 6, the specific structures of the traveling wheels 6 and the height adjusting member 7 are described in detail.

Figure 6:
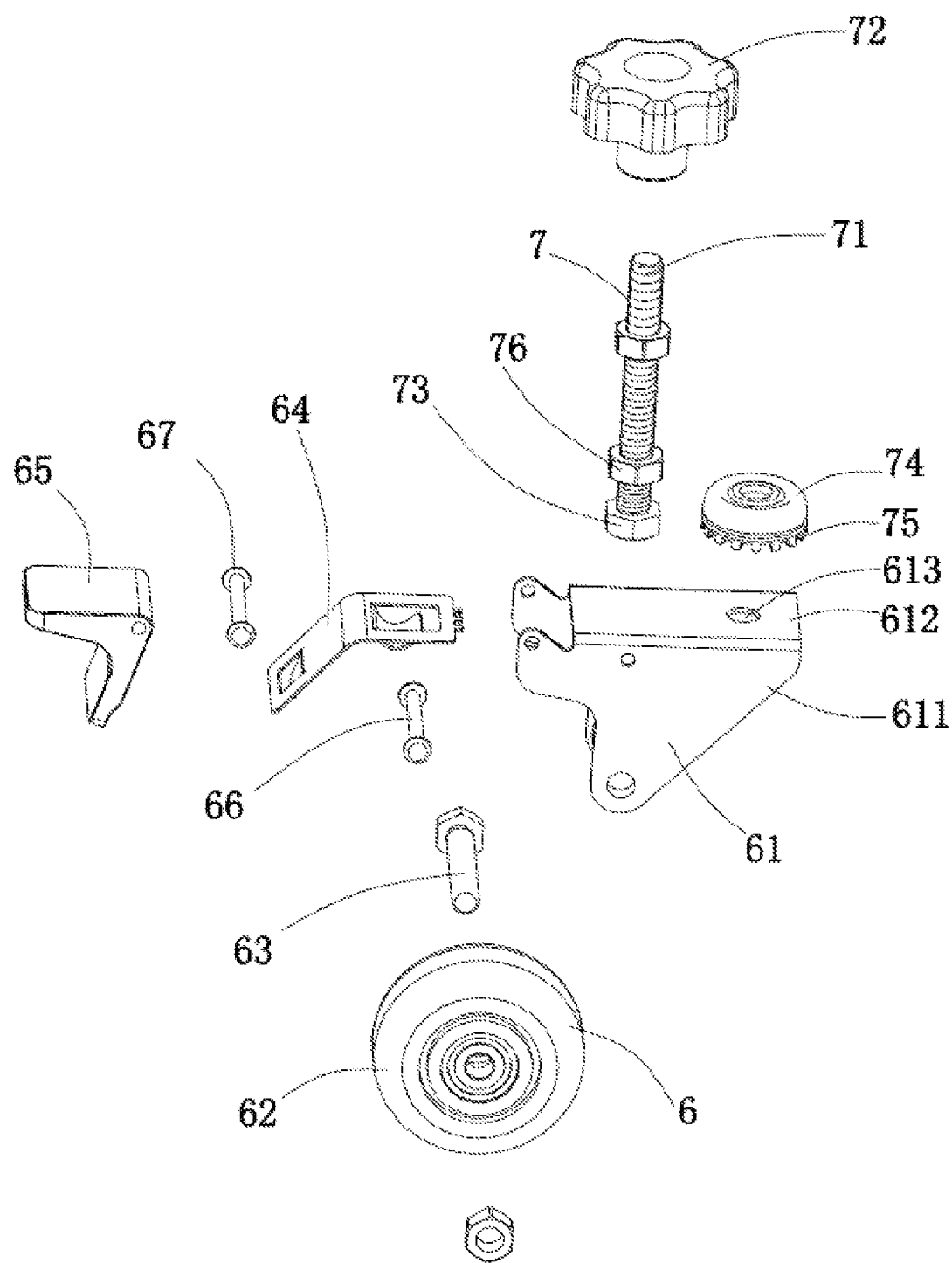
FIG. 6 is a schematic view of an exploded structure of the traveling wheel and a height adjustment member in a calibration device for a vehicle ADAS provided by an embodiment of the present disclosure.

As shown in FIGS. 4 to 6, the height adjusting member 7 is a knob screw, which is screwed to the bearing arm 12. One end of the knob screw is rotatably disposed on the traveling wheel 6, and the other end is the operating end. The bearing arm 12 can be controlled to lift by rotating the knob screw, thereby adjusting the height between the bearing arm 12 and the ground, so that the foldable base 1 can overcome higher obstacles.

As shown in FIGS. 4 to 6, in the present embodiment, the traveling wheels 6 are brake-type universal wheels, which make the position of the foldable base 1 convenient and stable. Among them, the knob screw and the brake-type universal wheels are rotatably connected by a bearing 74, and the rotation axis of the rotating screw is coincide with the brake-type universal wheel.

As shown in FIGS. 4 to 6, the traveling wheel 6 includes a mounting frame 61 and a rotating wheel 62. Among them, the rotating wheel 62 is mounted on the mounting frame 61 to rotate through a sixth rotating shaft 63. In a preferred embodiment, the rotating wheel 62 is a TPR (Thermo-Plastic-Rubber material, thermoplastic rubber) wheel, which can increase the friction between the wheel 62 and the ground to ensure the stability of the mobile positioning base at the current position. In other embodiments, the rotating wheel 62 can be a polyurethane wheel, a plastic wheel, a nylon wheel or a steel wheel.

As shown in FIGS. 4 to 6, the mounting frame 61 includes two parallel plates 611 arranged at intervals and a connecting plate 612 connecting the two parallel plates 611. The mounting frame 61 has a U-shaped structure as a whole, and the rotating wheel 62 is rotatably arranged between two parallel plates 611 through the sixth rotating shaft 63, such that the traveling wheels 6 have the advantages of easy production and installation.

As shown in FIGS. 4 to 6, the connecting plate 612 is provided with a through hole 613, and the height adjusting member 7 includes a screw 71 and a knob handle 72. The screw 71 and the bearing arm 12 are threadedly connected, and the knob handle 72 is arranged at the operating end of the screw 71. The end of the screw 71 away from the knob handle 72 is provided with a first nut 73 with an outer diameter greater than the diameter of the through hole 613, and the connecting plate 612 is provided with a bearing 74, and the bearing 74 and the first nut 73 are respectively located on both sides of the connecting plate 612, the end of the screw 71 away from the first nut 73 passes through the through hole 613 and the bearing 74 successively, and is threadedly connected to the bearing arm 12, and then the knob handle 72 is installed, so that the first nut 73 and the bearing 74 are located on the two sides of the connecting plate 612, the screw 71 passes through the through hole 613 and is rotatably connected to the mounting frame 61 through the bearing 74. Among then, the first nut 73 is configured to prevent the screw 71 from separating from the mounting frame 61, and the bearing 74 is configured to connect the screw 71 and the mounting frame 61 rotatably, so that the traveling wheel 6 can rotate freely around the axis of the height adjustment assembly.

Specifically, the bearing 74 is a ball bearing, and the ball bearing includes an inner ring and an outer ring that can rotate relative to each other. Among then, the outer ring of the bearing 74 is fixed on the connecting plate 612 through a limiting block 75. The limiting block 75 is provided with limiting teeth on the side which close to the connecting plate 612. The limiting teeth abut against the connecting plate 612, and the limiting teeth are configured to limit the relative position change of the limiting block 75 and the connecting plate 612, so that the outer ring of the bearing 74 and the connecting plate 612 are fixed together, which can help the inner ring of the bearing 74 rotate relative to the connecting plate 612.

Specifically, a nut 76 is screwed on the screw 71, and the nut 76 abuts on the inner ring of the bearing 74 so that both the screw 71 and the inner ring rotate synchronously with respect to the outer ring. The screw 71 realizes the synchronous rotation of the screw 71 and the inner ring through the friction between the nut 76 and the inner ring, and is configured to space the bearing arm 12 and the outer ring of the bearing 74 to ensure that the inner ring can rotate. The use of the nut 76 enables the installation between the screw 71 and the inner ring to have the advantages of adjustable position and convenient installation.

As shown in FIGS. 4 to 6, the traveling wheel 6 also includes a brake pad 64 rotatably arranged on the mounting frame 61 by a seventh rotating shaft 66 and a pedal 65 rotatably arranged on the mounting frame 61 rotated by an eighth rotating shaft 67, the brake pad 64 and the pedal 65 are both arranged between two parallel plates 611. The brake pad 64 is located above the top of the rotating wheel 62. The pedal 65 drives the brake pad 64 and the rotating wheel 62 to abut or separate when subjected to external force. The pedal 65 is convenient for the user to apply force. The seventh rotating shaft 66 and the eighth rotating shaft 67 are both damped and arranged on two parallel plates 611, so that the brake pads 64 and the pedal 65 are damped and connected to the mounting frame 61, in this way, the stability of the brake pad 64 being parked at the current position is ensured, thereby ensuring that the brake pad 64 can restrict the rotating wheel 62 from rolling.

As shown in FIGS. 1 and 4, a gradienter 8 is provided on the beam assembly 3. The gradienter 8 is configured to determine the level of the laser 4 on the beam assembly 3, and the level adjustment of the gradienter 8 is realized by the height adjusting member 7.

Embodiment 4

In the present embodiment, based on the embodiments 1-3, as shown in FIGS. 1 to 11, the specific structure of the stand assembly 2 is described in detail.

Figure 7:
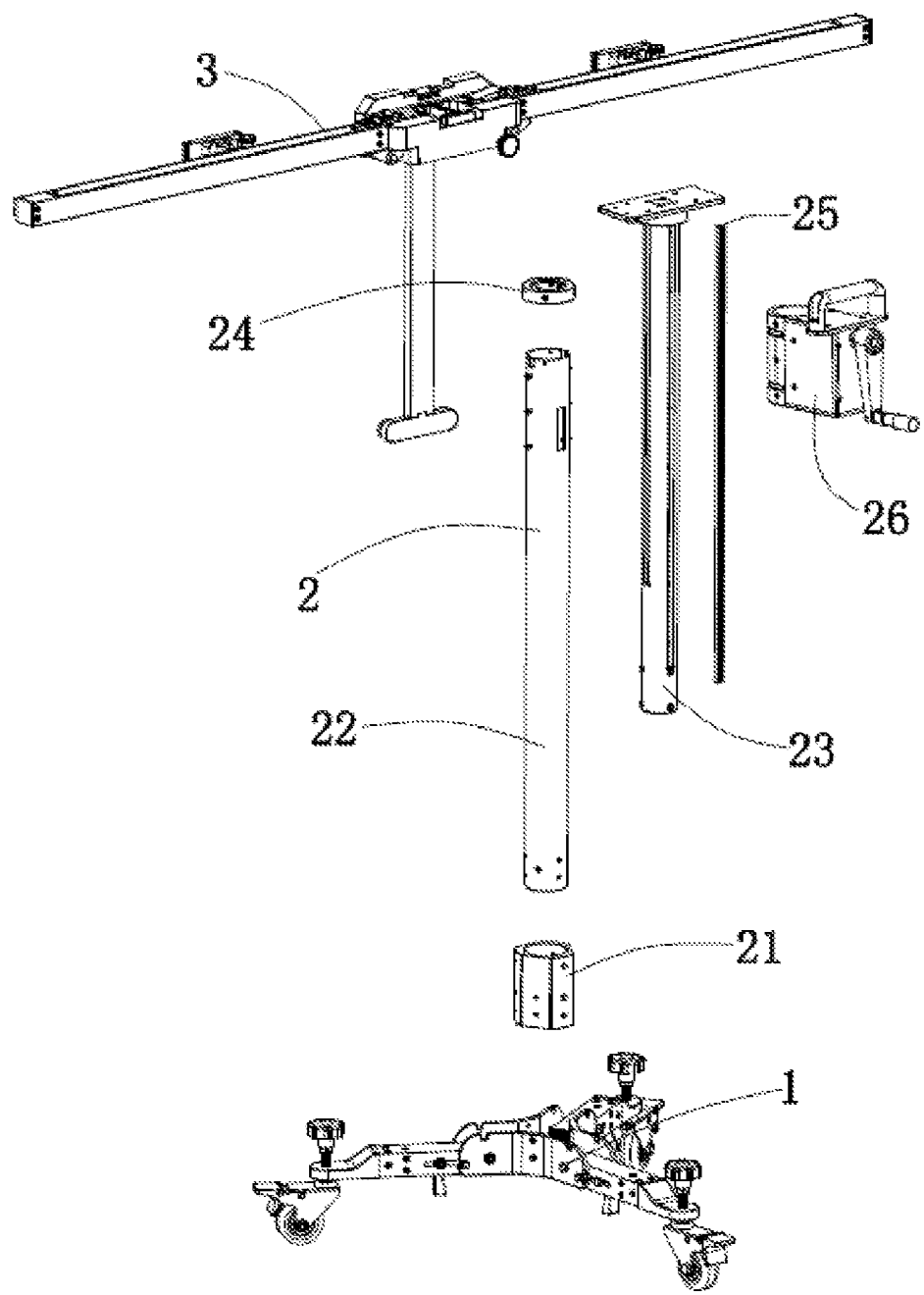
FIG. 7 is a schematic view of an exploded structure of a stand assembly of a calibration device for a vehicle ADAS provided by an embodiment of the present disclosure.
Figure 8:
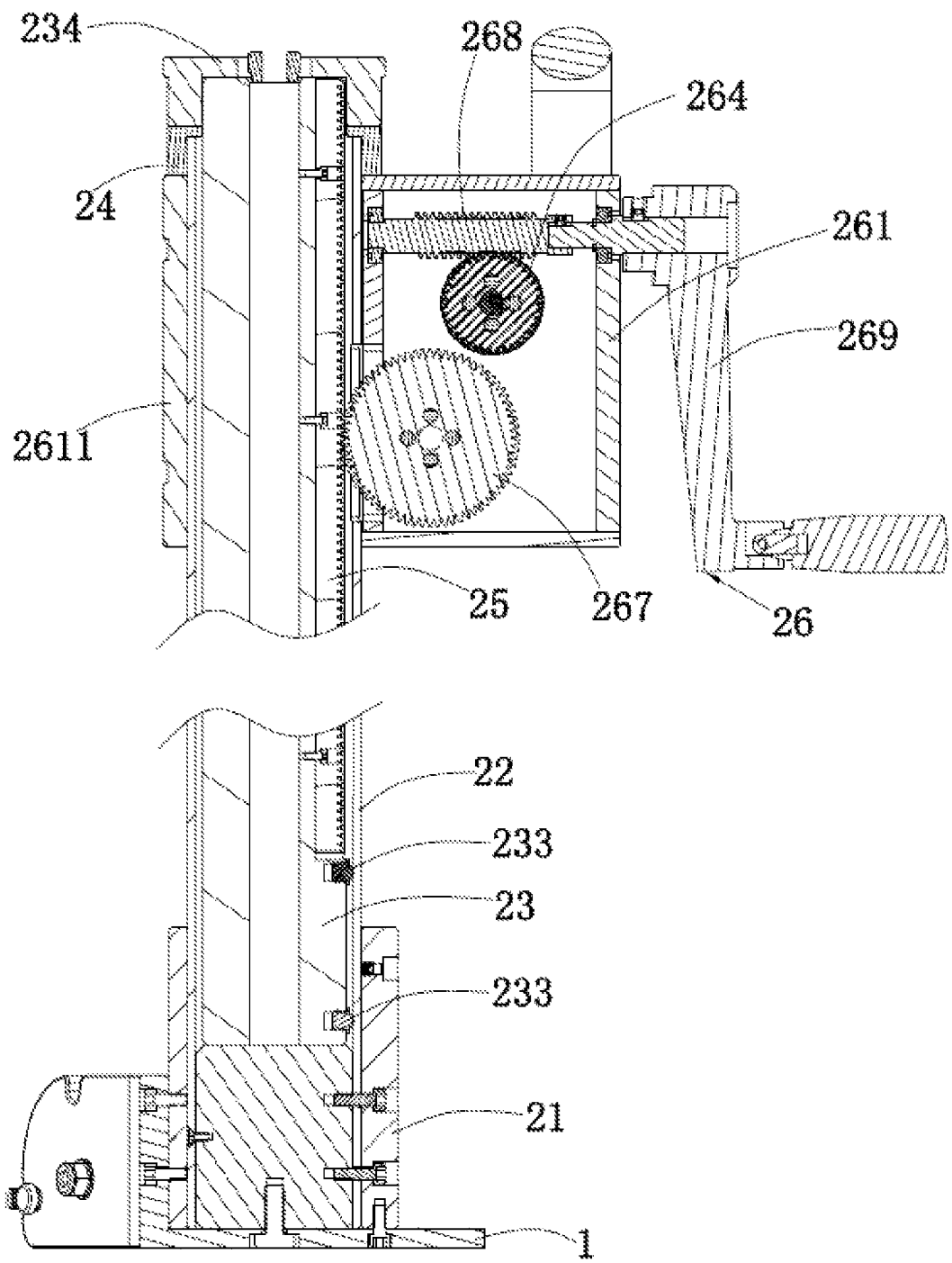
FIG. 8 is a schematic view of a cross-sectional structure of a stand assembly of a calibration device for a vehicle ADAS provided by an embodiment of the present disclosure.
Figure 9:
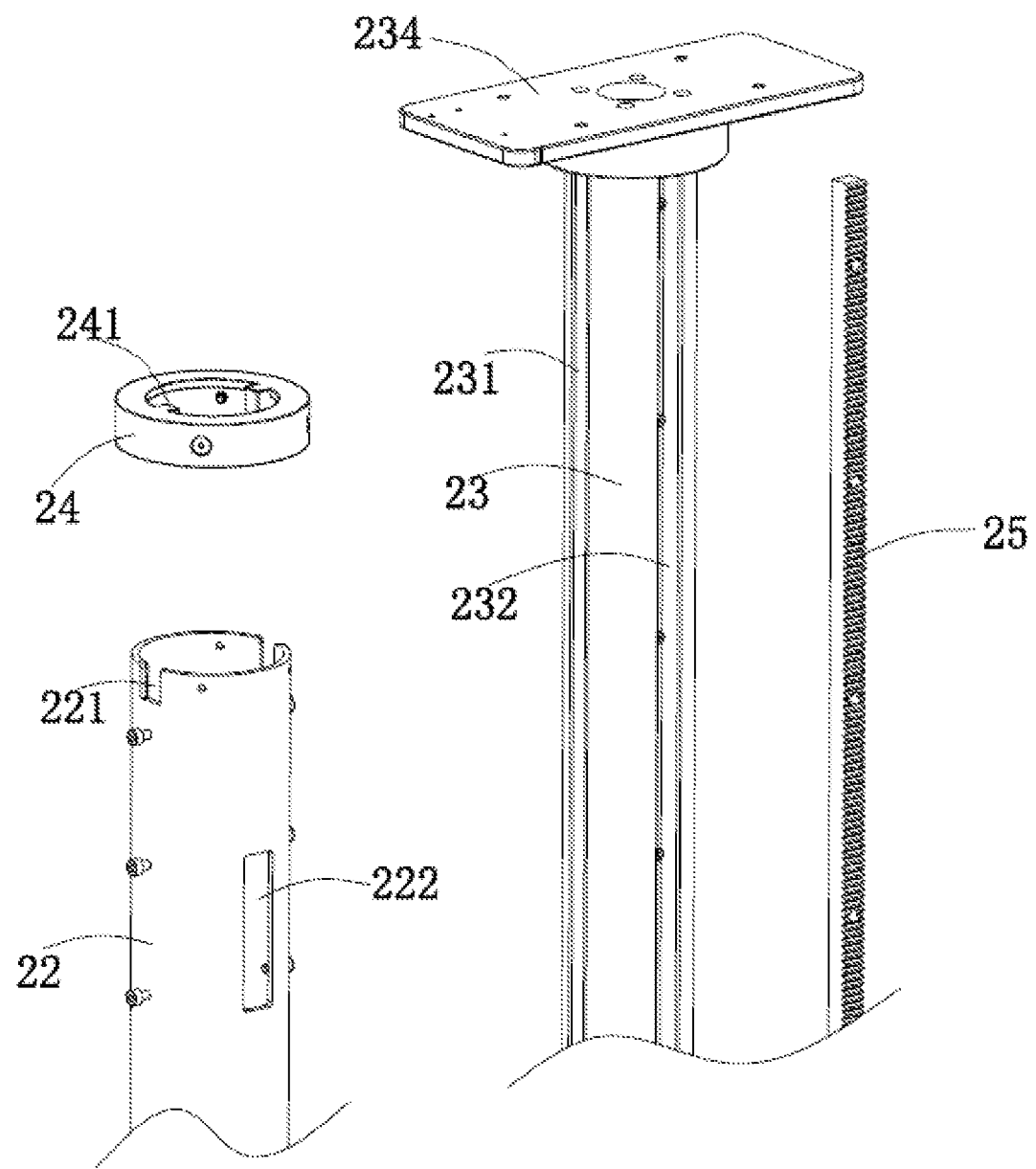
FIG. 9 is a schematic view of a partial enlarged structure of a stand assembly of a calibration device for a vehicle ADAS provided by an embodiment of the present disclosure.

As shown in FIGS. 7, 8 and 9, the stand assembly 2 includes: a fixing seat 21, an outer column 22, an inner column 23, a limiting ring 24, a transmission member 25, and a drive member 26.

Among them, the fixing seat 21 is fixed at the center of the bearing seat 11 by screws, and one end of the outer column 22 is fixed on the fixing seat 21 by screws. The outer column 22 is firstly inserted into the fixing seat 21 and then is fixed together using screws from the side surface of the outer column 22.

Among them, the outer column 22 is a hollow column, the inner portion of the outer column 22 has a channel with the same cross section as that of the inner column 23, the inner column 23 is movably inserted into the outer column 22, and there is a gap between the inner wall of the outer column 22 and the outer wall of the inner column 23, and the gap is configured to reduce the contact area between the outer column 22 and the inner column 23, thereby reducing the friction force when the inner column 23 is lifted relative to the outer column 22, which is convenient and labor-saving.

The beam assembly 3 and the laser 4 are installed at the end of the inner column 23 away from the fixing seat 21. Specifically, a mounting plate 234 for installing the beam assembly 3 and the laser 4 is fixed in the inner column 23. The laser 4 and inner column 23 are located on the same axis, so as to ensure accurate positioning of the laser 4.

Among them, the limiting ring 24 is arranged at the end of the outer column 22 away from the fixing seat 21, the limiting ring 24 is provided with a first engagement portion 241, the inner column 23 is provided with a second engagement portion 231, and the first engagement portion 241 and the second engagement portion 231 are engaged, such that the second engagement portion 231 can only slide back and forth along the longitudinal direction of the outer column 22 relative to the first engagement portion 241, so that the inner column 23 can move up and down relative to the outer column 22; the first engagement portion 241 and the second engagement portion 231 are configured for limiting the relative rotation of outer column 22 and inner column 23 to ensure the precise position of the laser 4 installed onto inner column 23. The laser 4 is configured to position the center axis of the vehicle to determine the relative position between the target plate 5 on the beam assembly 3 and the vehicle.

Among them, the transmission member 25 is arranged on the inner column 23 and the transmission member 25 is flush with the outer surface of the inner column 23 or recessed on the outer surface of the inner column 23, so as to ensure that the transmission member 25 will not abut with the inner wall of the outer column 22 to ensure that the friction between inner column 23 and outer column 22 will not be increased. The drive member 26 is disposed on the outer column 22 and connected to the transmission member 25. The drive member 26 drives the inner column 23 to lift by driving the transmission member 25 to lift. The drive member 26 can be controlled manually, or the drive member 26 can be controlled electrically, such as by the motor plus gear, to drive the transmission member 25 to lift. Alternatively, the inner column 23 is provided with a screw, the bottom of the screw is provided with a screw motor, and the screw motor is installed on the bearing seat 11, the inner column 23 is lifted by a lead screw disposed onto the screw. In order to be suitable for more environments such as no power supply environment, the drive member 26 of the present embodiment adopts a manual control method.

In the present disclosure, the outer column 22 is an outer cylinder, and the inner column 23 is an inner cylinder. In other embodiments, the outer column 22 and the inner column 23 are both regular polygons with the same cross-sectional shape, such as triangles, rectangles, rhombuses, squares, regular hexagons, etc. For example, the outer column 22 and inner column 23 are replaced by square columns, in this case, the limiting ring 24 can be omitted. That is, the stand assembly 2 includes a fixing seat 21, an outer square column, an inner square column, a transmission member 25 and a drive member 26. The inner square column is tightly inserted into the outer square column. The inner square column and the outer square column can prevent the inner square column from rotating. The cross-sections of the inner and outer square columns are not limited to squares, but can also be triangles, pentagons, hexagons, ellipses or arcs combined with straight lines and polygons, as long as the inner square column cannot rotate relative to the outer square column being guaranteed.

In the present embodiment, the inner column 23 is inserted in the outer column 22 and spaced from the outer column 22, which reduces the contact area, thereby reducing the friction force, so that the lifting of the inner column 23 is labor-saved, and the outer column 22 and the inner column 23 pass through the first engagement portion 241 and the second engagement portion 231 are limited to prevent relative rotation between the outer column 22 and the inner column 23, and ensure the position accuracy of the inner column 23. The lifting of the inner column 23 is realized by the cooperation of the transmission member 25 and the drive member 26, which only needs one person to operate, and making the lifting of inner column 23 has the advantages of simple operation, good stability, high precision and time saving.

As shown in FIG. 7, FIG. 8 and FIG. 9, since the outer column 22 and the inner column 23 are both cylinders, the limiting ring 24 is an annular ring structure, and the first engagement portion 241 is a protrusion radially protruding from the limiting ring 24 and the second engagement portion 231 is a groove provided on the inner column 23 and slidably engaged with the protrusion. The length direction of the groove is the same as that of the inner column 23. In the present embodiment, the friction between the inner column 23 and the outer column 22 only comes from the friction between the protrusion and the side walls of the groove, and the contact area is relatively smaller, which can save effort. Two protrusions and two grooves are symmetrically arranged, and the transmission member 25 is arranged in the middle of the arcs of the two grooves.

As shown in FIG. 7, FIG. 8 and FIG. 9, one end of the outer column 22 away from the fixing seat is provided with a notch 221 for the protrusion inserting into the outer column 22. The limiting ring 24 is fixed on the outer column 22 by fasteners such as screws. The notch 221 is communicated to an end surface of outer column 22. The protrusion is engaged into the notch 221 during installation, so that the limiting ring 24 is attached to the outer column 22, then using screws to fix the limiting ring 24 and outer column 22 to make the limiting ring 24 is easy to disassemble and assemble.

As shown in FIG. 7, FIG. 8 and FIG. 9, the inner column 23 is provided with a receiving groove 232, and the transmission member 25 is fixed in the receiving groove 232 by a fastener such as a screw, so that the transmission member 25 is detachable and does not protrude an outer surface of inner column 23. In a preferred embodiment, the transmission member 25 is a straight rack, and in other embodiments, the transmission member 25 is a helical rack.

As shown in FIG. 7, FIG. 8 and FIG. 9, one end surface of the inner column 23 inserted into the outer column 22 is provided with a plurality of limiting rods 233, the plurality of limiting rods 233 are spaced apart in an equi-arc, and an end surface of each of the limiting rods 233 is in contact with the inner wall of the outer column 22, the function of the limiting rod 233 is to ensure that the axis of the inner column 23 coincides with the axis of the outer column 22, thereby ensuring the position accuracy of the laser 4 onto the inner column 23. In the present embodiment, some of the limiting rods 233 abut against the corresponding protrusions to stop the inner column 23 from lifting when the limiting rods 233 are lifted to the limiting ring 24 along with the inner column 23. At this time, the limiting rods 233 can also prevent inner column 23 from rising and detaching from outer column 22, and ensure the stability of the insertion of the inner column 23 into the outer column 22. In the present embodiment, the limiting rods 233 may be arranged in multiple turns along the axis of the inner column 23 at intervals.

As shown in FIG. 7, FIG. 8 and FIG. 9, the limiting rods 233 are screws, so that the height of the limiting rods 233 protruding from the outer surface of the inner column 23 can be adjusted so as to be suitable for the difference width of the gap between the inner column 23 and the outer column 22. In addition, the surface of the limiting cap of the screw in contact with the inner wall of the outer column 22 is an arc-shaped surface, and its arc-shaped surface fits the arc of the inner wall of the outer column 22, thus ensuring the fitting stability between the limiting rods 233 and the inner wall of the outer column 22. The limiting cap can be the nut itself of the screw, or a hemispherical protrusion provided on the nut of the screw, that is, the arc-shaped surface can be obtained by setting the nut of the screw into a hemispherical shape or setting a hemispherical protrusion onto the nut of the screw.

Figure 10:
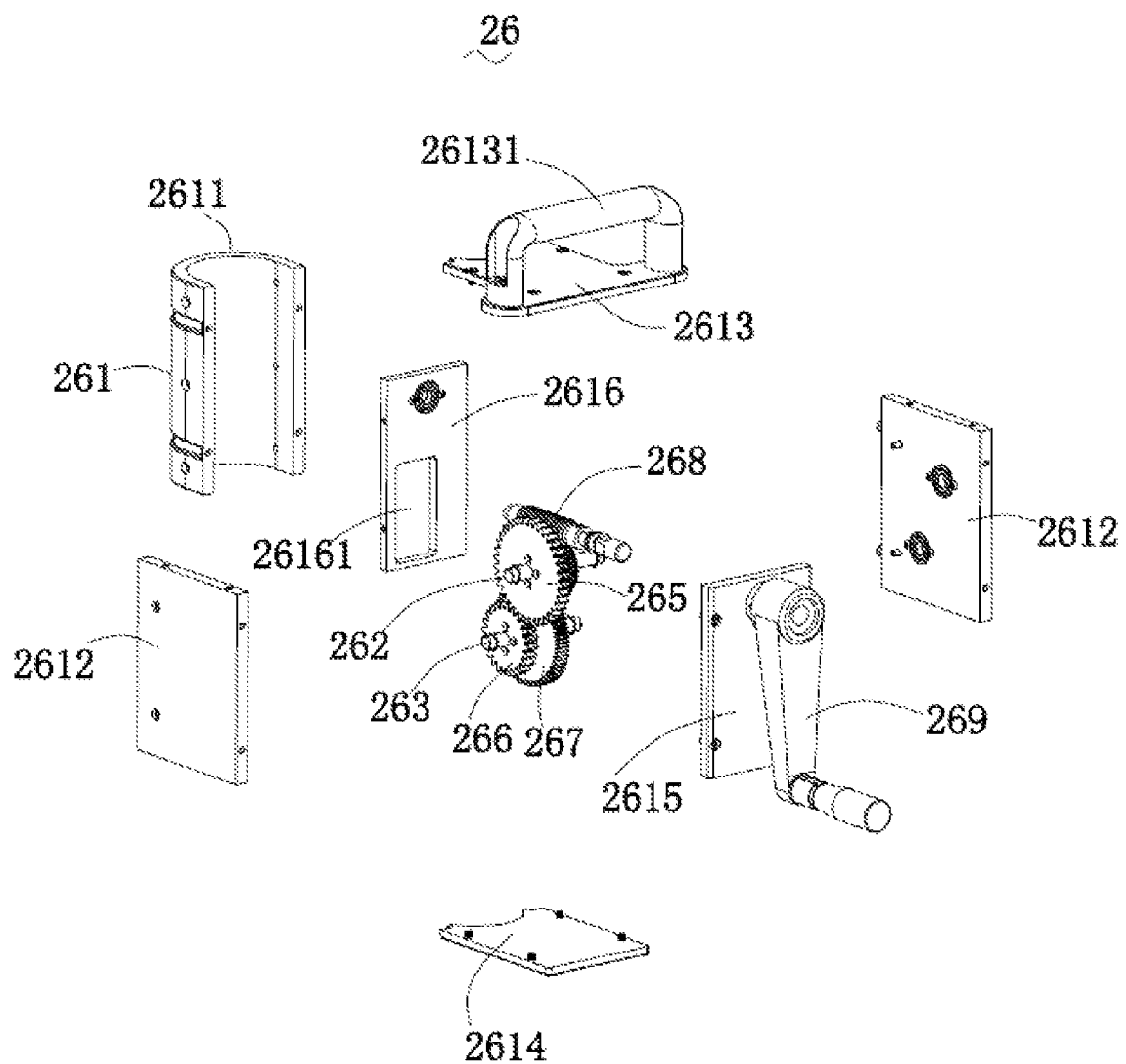
FIG. 10 is a schematic view of an exploded structure of a drive member of a stand assembly of a calibration device for a vehicle ADAS provided by an embodiment of the present disclosure.
Figure 11:
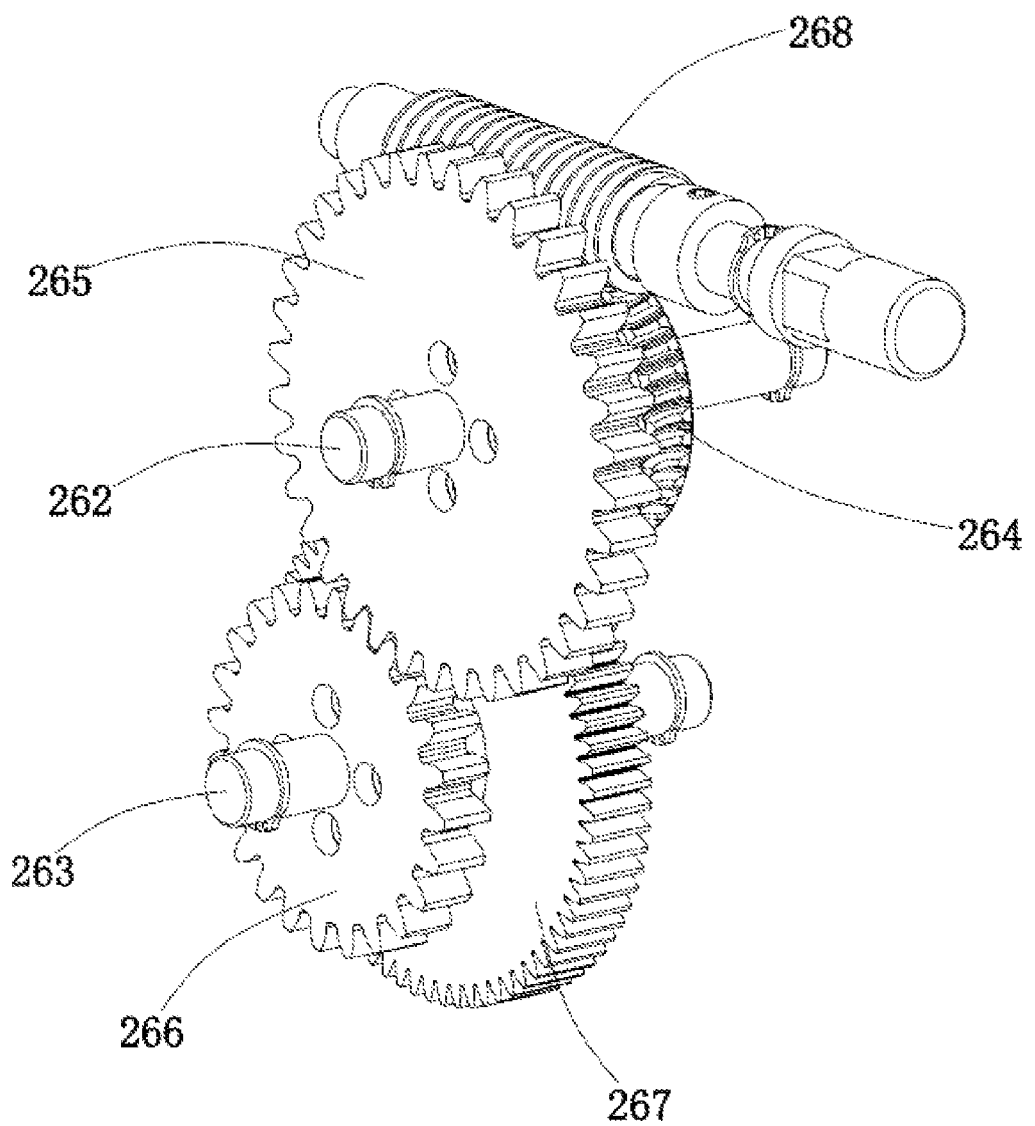
FIG. 11 is a schematic view of an assembly structure of a turbine, a worm, a first transmission wheel, a second transmission wheel and a driving wheel in a drive member of a stand assembly in a calibration device for a vehicle ADAS provided by an embodiment of the present disclosure.

As shown in FIG. 8, FIG. 10 and FIG. 11, the drive member 26 includes: a box body 261 fixed on the outer column 22, a third rotating shaft 262 and a fourth rotating shaft 263 rotatably provided in the box body 261, a turbine 264 and a first transmission wheel 265 disposed on the third rotating shaft 262, a second transmission wheel 266 meshed with the first transmission wheel 265 and a driving wheel 267 meshed with the transmission member 25 that are disposed on the fourth rotating shaft 263, a worm 268 rotatably disposed on the box body 261 and in self-locking meshed with a turbine 264, and an operating handle 269 arranged outside the box body 261 and configured to drive the worm 268 to rotate. The outer column 22 is provided with a second slot 222 configured for a part of the driving wheel 267 extending into the outer column 22 and meshing with the transmission member 25, that is, the driving wheel 267 is a spur gear and meshes with a spur rack for transmission. Of course, the driving wheel 267 can also be a helical gear, and the transmission member 25 is a helical rack. When adjusting the lifting of the inner column 23, the user drives the worm 268 to rotate by the operating handle 269, the worm 268 drives the turbine 264 to rotate, so that the third rotating shaft 262 rotates, and the third rotating shaft 262 rotates to drive the first transmission wheel 265 to rotate, and the first transmission wheel 265 rotates to drive the second transmission wheel 266 to rotate, and when the second transmission wheel 266 rotates, it drives the fourth rotating shaft 263 to rotate, and the fourth rotating shaft 263 rotates to drive the driving wheel 267 to rotate, and the driving wheel 267 rotates to drive the transmission member 25 to lift, so as to realize the lifting of the inner column 23. Among them, the turbine 264 and the worm 268 have a self-locking function, which makes the inner column 23 stable at the current position. The first transmission wheel 265 and the second transmission wheel 266 have a good transmission function. The diameter of the first transmission wheel 265 is larger than the diameter of the second transmission wheel, which has a higher transmission ratio, saves effort. In other embodiments, the transmission mode of the transmission member 25 and the drive member 26 can also be connected by a conventional mechanical transmission mode such as chain transmission, screw transmission, worm gear transmission and the like.

As shown in FIG. 8, FIG. 10 and FIG. 11, the box body 261 includes: a semicircular plate 2611 fixed on the outer column 22 and half-enclosing the outer column 22; two side plates 2612 fixedly connected to the arc-shaped ends of the semicircular plate 2611; a top plate 2613, a bottom plate 2614, a front plate 2615 and a rear plate 2616 fixedly connected to the two side plates 2612 respectively; the front plate 2615 and the rear plate 2616 are configured to rotatably install the worm 268, and the two side plates 2612 are configured to rotatably install the third rotating shafts 262 and the fourth rotating shaft 263, the rear plate 2616 is provided with a second opening 26161 corresponding to the second slot 222, the second opening 26161 and the second slot 222 are used to facilitate the engagement of the driving wheel 267 with the transmission member 25. In the present embodiment, the outer column 22 passes through the box body 261, and the semicircular plate 2611 facilitates the installation of the side plates 2612. The third rotating shaft 262, the fourth rotating shaft 263 and the worm 268 are all arranged to rotate through a bearing seat. The first transmission wheel 265, the second transmission wheel 266, the turbine 264 and the worm 268 are all arranged in the box body 261 to improve safety. In the present embodiment, each plate of the box body 261 is fixed by screws.

In the present disclosure, the top plate is further provided with a handle 26131 configured for supporting the user with one hand, so that the user can apply force to the operating handle 269, and can prevent the stand assembly 2 from shaking.

Figure 12:
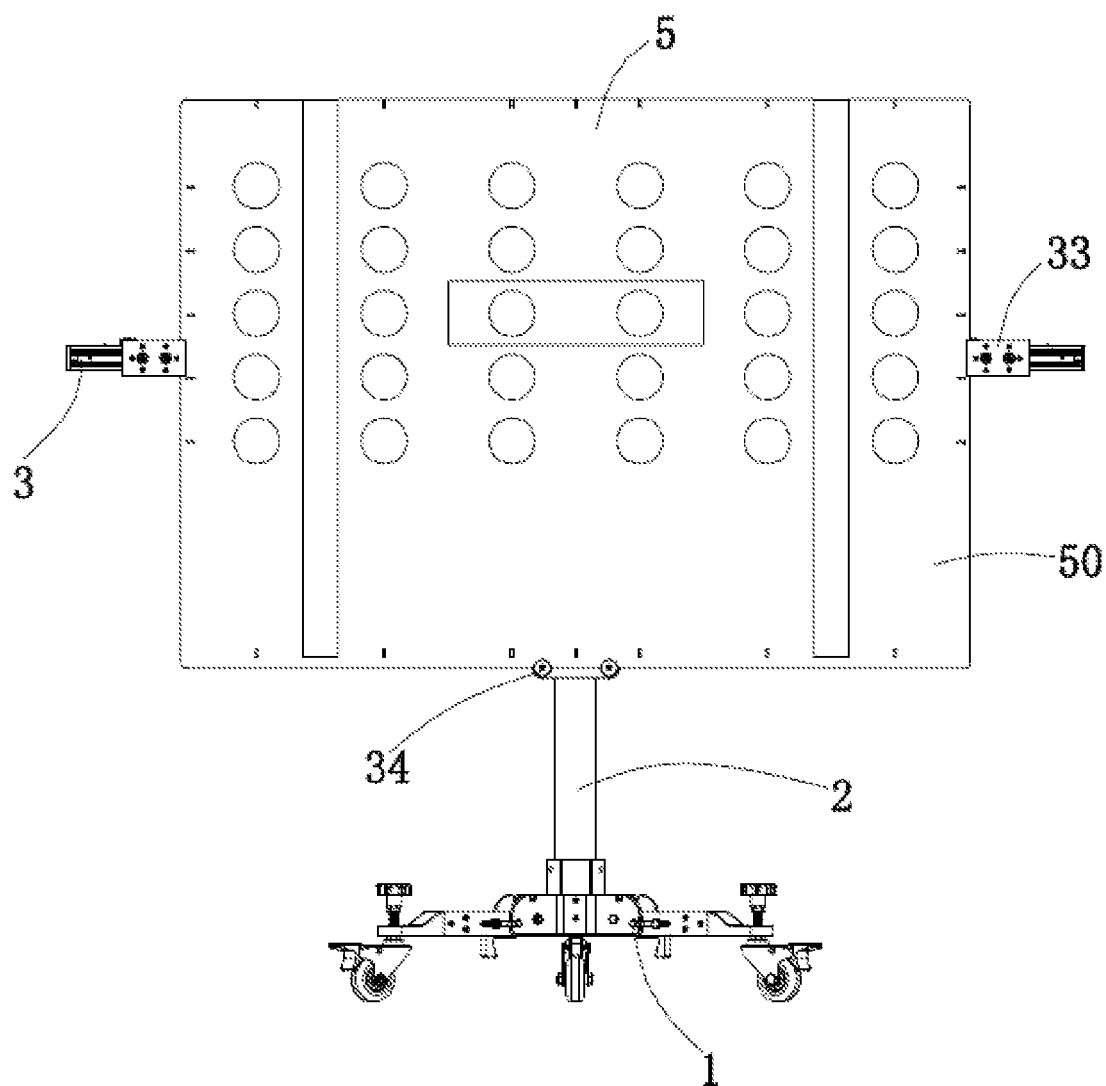
FIG. 12 is a schematic view of an overall structure of a calibration device for a vehicle ADAS provided with a large target plate installed in an embodiment of the present disclosure.

As shown in FIGS. 1 and 12, in the present embodiment, the target plates 5 includes a small target plate and a large target plate, and the target plates 5 are installed through the beam assembly 3.

Embodiment 5

In the Present Embodiment, on the Basis of the Foregoing Embodiments 1-4, as Shown in FIGS. 1 to 18, the Specific Structure of the Beam Assembly 3 is Described in Detail As shown in FIGS. 1, 3, 12, and 13, the beam assembly 3 is arranged on the top of the stand assembly 2. The beam assembly 3 includes: a mounting seat 31, a beam 32, a fixing block 33, and a supporting rod 34. Among them, the mounting seat 31 is fixed on the top of the stand assembly 2, specifically, a mounting plate 234 is provided on the top of the inner column 23, and the mounting seat 31 is installed on the mounting plate 234. The gradienter 8 is installed on the mounting seat 31. At least two beams 32 are provided, and each beam 32 can be folded toward the direction adjacent to the stand assembly 2. Specifically, the extending direction of the beam 32 can be folded from the horizontal direction to the vertical direction, and can also be unfolded from the vertical direction to the horizontal direction. In the present embodiment, the beam 32 is folded down, and the bearing arm 12 is unfolded up, so that the beam 32 and the bearing arm 12 are adjacent to the outer periphery of the stand assembly 2, thereby reducing the overall storage size of the calibration device for the vehicle ADAS and making it easy to carry. The laser 4 is arranged on the beam assembly 3 and is located on the symmetry line of the two beams 32. At the same time, the laser 4 is also located on the extension line of the stand assembly 2 to facilitate the positioning of the laser 4.

In the present embodiment, the bearing arm 12 of the foldable base 1 can be unfolded relative to the bearing seat 11 and stay at the current position stably, the beam 32 can also be unfolded from the horizontal direction to the vertical direction, and the bearing arm 12 and the beam 32 are unfolded relatively, so that when the calibration device for the vehicle ADAS is out of work, it occupy a smaller space and is convenient to carry, thereby facilitating the transportation and storage of the calibration device for the vehicle ADAS.

Figure 13:
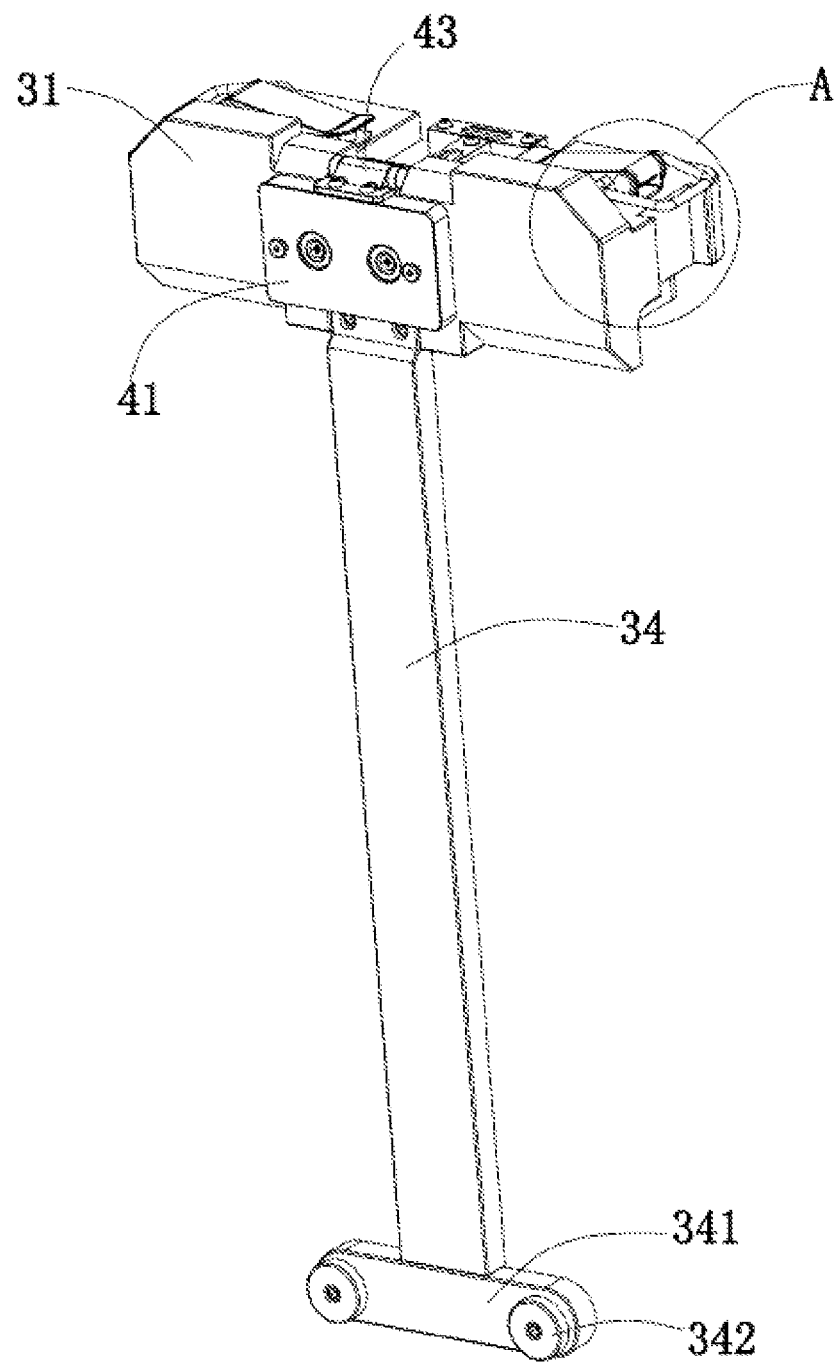
FIG. 13 is a schematic view of an assembly structure of a mounting seat and to supporting rod of a beam assembly in a calibration device for a vehicle ADAS provided by an embodiment of the present disclosure.

As shown in FIGS. 1, 12 and 13, there are two beams 32, and the two beams 32 are symmetrically arranged on both sides of the mounting seat 31, and the two beams 32 form straight line with the mounting seat 31 when unfolded. Each of the beams is provided with at least one fixing block 33, the fixing block 33 is slidably disposed on the beam 32, and each fixing block 33 can be configured to fix a small target plate individually. The beam 32 is provided with scale line for positioning the position of the fixing block 33, the scale line is used to conveniently determine the distance between the fixing block 33 and the laser 8, so as to facilitate the adjustment of the distance between the target plate 5 and the laser 8. The supporting rod 34 is arranged on the mounting seat 31, the length direction of the supporting rod 34 is perpendicular to the length direction of the beam 32, and the supporting rod 34 is located on the symmetry line of the two beams 32, that is, the length direction of the supporting rod 34 s the same as that of the stand assembly 2. Since the supporting rod 34 is arranged on the mounting seat 31 and the mounting seat 31 is arranged on the stand assembly 2, such that the length directions of the supporting rod 34 and the stand assembly 2 are overlapped, so that the supporting rod 34 will not interfere the sliding of the fixing block 33, therefore, the supporting rod 34 does not need to be disassembled.

When a large target plate is installed, the supporting rod 34 is configured to hold the lower edge of the large target plate, and the two fixing blocks 33 are used to clamp the two sides of the large target plate to complete the fixing of the large target plate. In the present embodiment, since the supporting rod 34 is a fixed structure, such that the supporting rod 34 has good stability and accuracy when holding the large target plate. The beam assembly 3 of the present embodiment can install target plates 5 of various sizes, without other redundant workload, and the operation is simple.

As shown in FIG. 13, in the present embodiment, one end of the supporting rod 34 is fixed on the mounting seat 31, the supporting rod 34 is fixed in the middle of the lower bottom of the mounting seat 31 by screws, and the other end of the supporting rod 34 is provided with a cross rod 341 whose length direction is perpendicular to that of the supporting rod 34, the cross rod 341 is parallel to the beam 32, so that the connecting line between the cross rod 341 and the two fixing blocks 33 is parallel. The cross rod 341 is provided with at least two supporting members 342 spaced apart and configured to hold the lower edge of the large target plate. The supporting member is provided at least two, which is configured to ensure that the large target plate is placed on the two supporting members 342 in a horizontal state, thereby ensuring the accuracy of positioning of the large target plate.

In the present embodiment, the supporting member 342 is provided with a limiting groove for supporting the lower edge of the large target plate, and the limiting groove is configured to fix the position of the large target plate. In the present embodiment, the supporting member 342 is arranged on the cross rod 341 by screws, so that the supporting member 342 can be detachably installed, so that the supporting member 342 with different limiting grooves can be replaced to be suitable for large target plates of different thicknesses.

In the present embodiment, the length of the cross rod 341 is less than the length of the mounting seat 31. As shown in FIG. 2, when the calibration device for the vehicle ADAS is stored, the cross rod 341 does not occupy additional space, so that the calibration device for the vehicle ADAS occupies a smaller space when it is stored.

Figure 14:
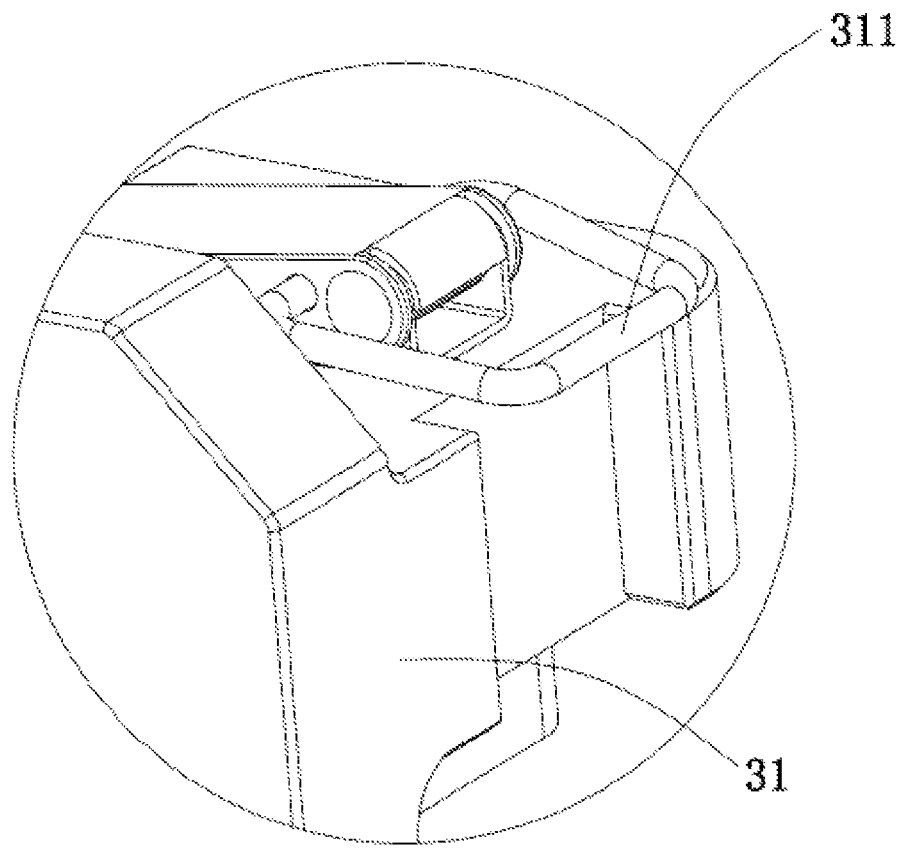
FIG. 14 is an enlarged view of A in FIG. 13.
Figure 15:
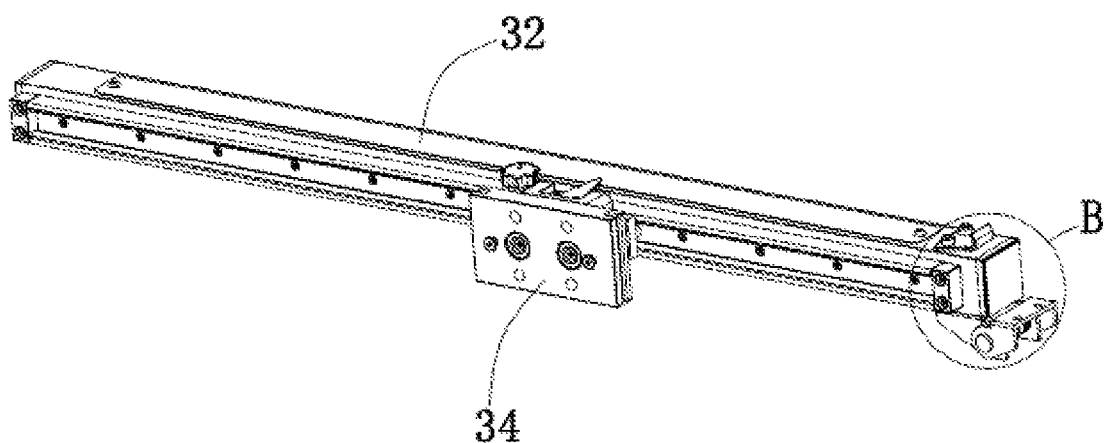
FIG. 15 is a schematic view of a position structure of beams and fixing blocks of a beam assembly in a calibration device for a vehicle ADAS provided by the embodiment of the present disclosure.
Figure 16:
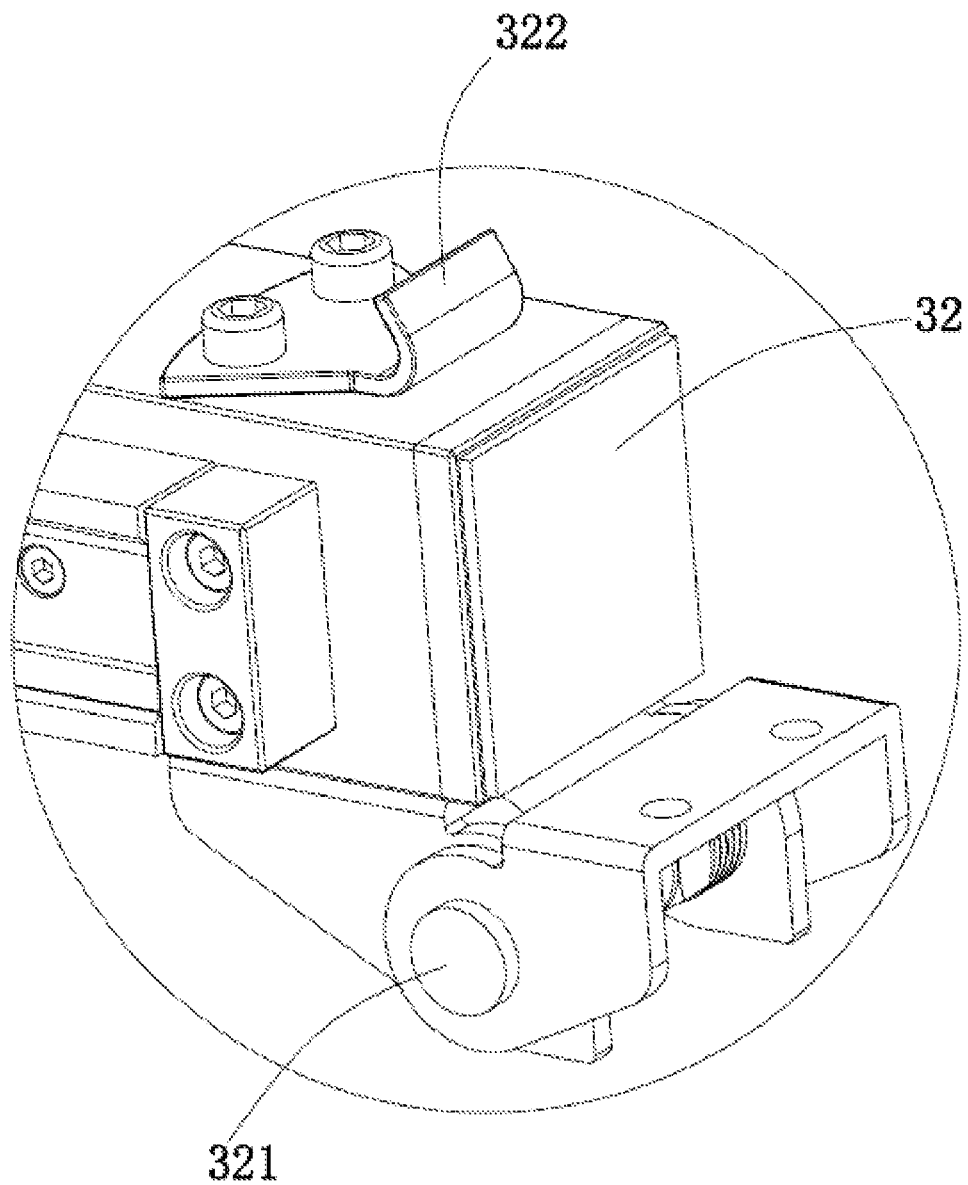
FIG. 16 is an enlarged view of B in FIG. 15.

As shown in FIG. 14, FIG. 15 and FIG. 16, one end of the beam 32 is rotatably disposed on the mounting seat 31 through the fifth rotating shaft 321, and the fifth shaft 321 can be a bolt. The beam 32 is provided with a first connection member 322 and the mounting seat 31, the mounting seat 31 is provided with a second connection member 311, and two beams 32 form in a horizontal straight line, that is, the beam 32 is in a unfolded state when the first connection member 322 and the second connection member 311 are connected. The two beams 32 can be bent down and fit the stand assembly 2, that is, the beam 32 is in the folded storage state when the first connection member 322 is not connected with the second connection member 311, as shown in FIG. 2, so that the calibration device for the vehicle ADAS occupies a smaller space when it is stored, and easy to be carried. The first connection member 322 is a fixed hook, and the second connection member 311 is a rotating hook. In other embodiments, the beam 32 and the mounting seat 31 can also be restricted from rotating by means of bolts or latches.

Figure 17:
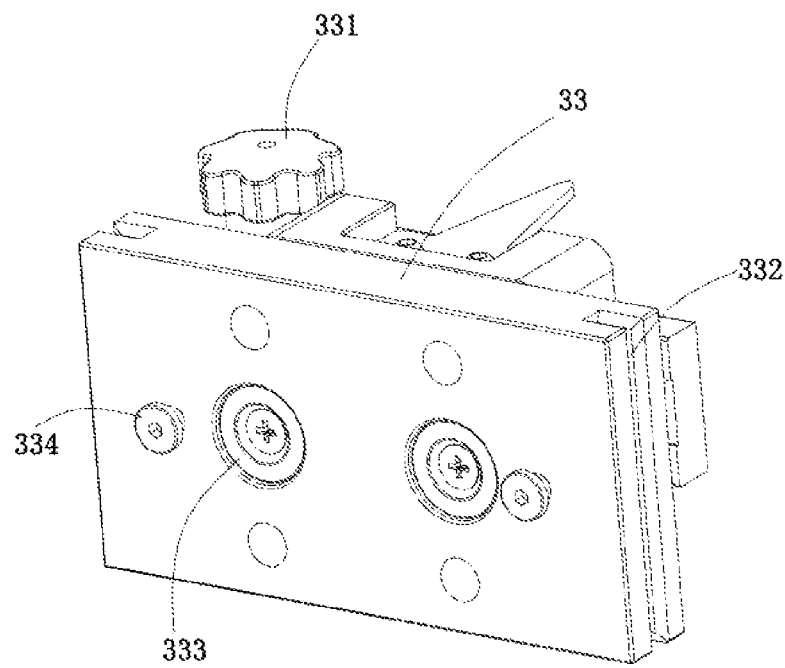
FIG. 17 is a schematic view of an overall structure of fixing blocks of a beam assembly in a calibration device for a vehicle ADAS provided by an embodiment of the present disclosure.

As shown in FIGS. 15 and 17, the fixing block 33 is provided with a tightening screw 331, and the tightening screw 331 and the fixing block 33 are threadedly connected and can be abutted or separated from the beam 32. In a preferred embodiment, the beam 32 is provided with a guide rail, and the fixing block 33 is slidably arranged on the beam 32 through the guide rail. The position of the fixing block 33 on the guide rail is fixed when the tightening screw 331 abuts the beam 32; and the fixing block 33 can slide on the beam 32 along the length direction of the guide rail when the tightening screw 331 separates from the beam 32. The position of the fixing block 33 is slidable, so that it is convenient for fixing a target plate 5 of different sizes. The fixing block 33 is provided with an indicator arrow, which is used to indicate the scale line, which is convenient for determining the position of the fixing block 33 on the beam 32. In other embodiments, the beam 32 is provided with a sliding groove, and the fixing block 33 is convexly provided with a protrusion that is slidably fitted into the sliding groove. The cross section of the sliding groove is in the shape of "凸", and the cross section of the fixing block 33 and the protrusion is in the shape of "工", this can ensure that the fixing block 33 slides stably on the beam 32. Or, the beam 32 is provided with a groove, and a guide rod is arranged in the groove, and the fixing block 33 partially extends into the groove and is sleeved on the guide rod, so as to realize a stable sliding connection of the fixing block 33 on the beam 32. Of course, the sliding method of the fixing block 33 on the beam 32 can also adopt other methods such as screw drive, as long as the fixing block 32 can be stably slid on the beam 32.

As shown in FIGS. 15 and 17, a side surface of the fixing block 33 is provided with a third slot 332, and the third slot 332 is configured for the side edge of the large target plate being inserted into. Two fixing blocks 33 can clamp the edges of both sides of the large target plate, thereby preventing the large target plate from shaking left and right.

As shown in FIGS. 15 and 17, a rear side of the small target plate is provided with a first connection hole, and a side surface of the fixing block 33 configured for mounting the small target plate is concavely provide with a first magnet 333 configured for attracting the small target plate, and a first connection member 334 configured for connecting with the first connection hole. The first connection member 334 is firstly connected to the first connection hole on the small target plate, then the first magnet attracts the small target plate such that the small target plate and the side surface of the fixing block 33 are fit firmly, so as to ensure the firmness of installation of the small target plate. The fixing block 33 is provided with a counter bore, and the first magnet 333 is fixed in the counter bore by a screw. Among them, the rear side of the small target plate can be provided with a rear plate 42 to be described below, and the first connection hole is provided on the rear plate 42. At this time, the first connection hole has the same structure as the second connection hole 421 to be described below.

Specifically, the first connection member 334 is a T-shaped member with a T-shaped vertical section, the first connection hole is a limiting connection hole that is connected to the first connection member 334, and the small target plate is provided with a receiving groove communicated with the limiting connection hole, and the cross-sectional area of the receiving groove is larger than the cross-sectional area of the limiting connection hole. After the T-shaped member and the limiting connection hole are connected, the small target plate cannot be pulled out directly, so as to ensure the firmness of installation of the small target plate.

Figure 18:
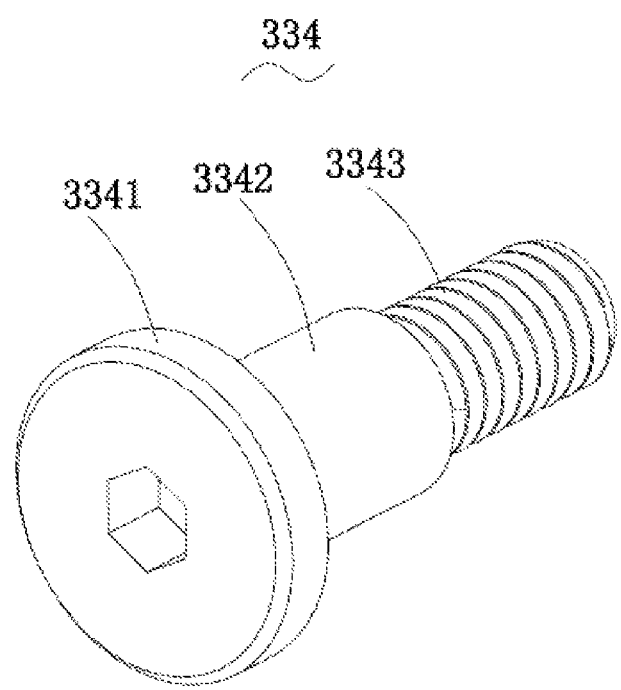
FIG. 18 is a schematic structural view of a first connection member of a beam assembly in a calibration device for a vehicle ADAS provided by an embodiment of the present disclosure.
Figure 19:
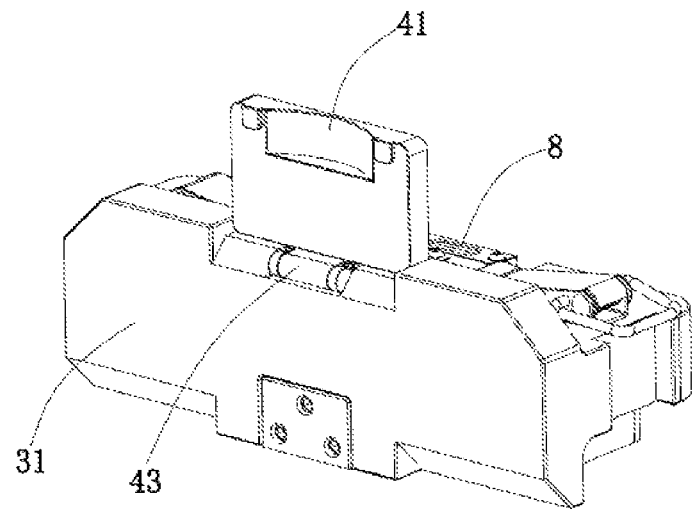
FIG. 19 is a schematic structural view in which a rotatable plate in a calibration device for a vehicle ADAS provided by an embodiment of the application is turned 180° relative to a mounting seat.

As shown in FIGS. 17 and 18, the T-shaped member is preferably a screw, and the limiting connection hole is preferably a gourd hole. The screw includes a second nut 3341, a smooth section 3342 and a threaded section 3343 that are connected in sequence. The threaded section 3343 is configured for threadedly connecting the fixing block 33 to facilitate the disassembly and assembly of the screw. The length of the smooth section 3342 is approximately the same as the depth of the limiting connection hole, and the smooth section 3342 is configured to carry the small target plate. An outer diameter of the second nut 3341 is smaller than a diameter of a large hole of the limiting connection hole and greater than a small hole of the limiting connection hole, and the second nut 3341 passes through the large hole of the limiting connection hole and is fixed in the receiving groove during installation, and then the small target plate is pressed down so that the small hole of the limit connection hole and the smooth section 3342 are engaged. At this time, the second nut 3341 can restrict the small target plate from separating from the fixing block 33, ensuring the stability of the small target plate being installed on the fixing block 33. The screw is provided with two to prevent the small target plate from shaking left and right, since the structure of the first connection hole and the second connection hole 421 to be described below are the same, the specific structure of the first connection hole can refer to the following description of the second connection hole 421.

Embodiment 6

In the present embodiment, on the basis of the foregoing embodiments 1-5, as shown in FIGS. 1 to 22, the installation method of the laser 4 and the mounting seat 31 is described in detail.

As shown in FIGS. 1, 13, 19 and 20, in the present embodiment, the laser 4 is arranged on the mounting seat 31 by a rotatable plate 41 and a hinge 43. The rotatable plate 41 can be turned upwards by 180° such that the laser 4 is recessed on a side surface of the mounting seat 31 adjacent to the target plate 5, so that the laser 4 does not need to be disassembled and will not interfere with the installation of the large target plate.

Specifically, the rotatable plate 41 is first arranged on the mounting seat 31 through the hinge 43, and the laser 4 is detachably mounted on the rotatable plate 41. Wherein, the side surface of the mounting seat 31 is substantially flush with the side surface of the stand assembly 2, or recessed in the side surface of the stand assembly 2 to ensure that the mounting seat 31 will not affect the installation of the large target plate, the side surface of the stand assembly 2 refers to the side surface close to the target plate 5. After the laser 4 is installed on the mounting seat 31 through the rotatable plate 41, the laser 4 will protrude from the side surface of the mounting seat 31. After the rotatable plate 41 is turned upward by 180°, based on the same side surface, the side surface of the mounting plate 234 facing away from the laser 4 is flush with the side surface of the mounting seat 31, or the side surface of the mounting plate 234 facing away from the laser 4 is recessed inside the side surface of the mounting seat 31. In this way, after the laser 4 is turned upward by 180°, it will not interfere with the installation of the large target plate, that is, the large target plate can be installed without disassembling the laser 4, which saves time and effort and has a protective effect on the laser 4, which effectively prevents the accident such as loss or damage to the laser 4 from occurring. In addition, the operation of the turning process is relatively simple, which saves the time for calibration of the calibration device for the vehicle ADAS.

Figure 20:
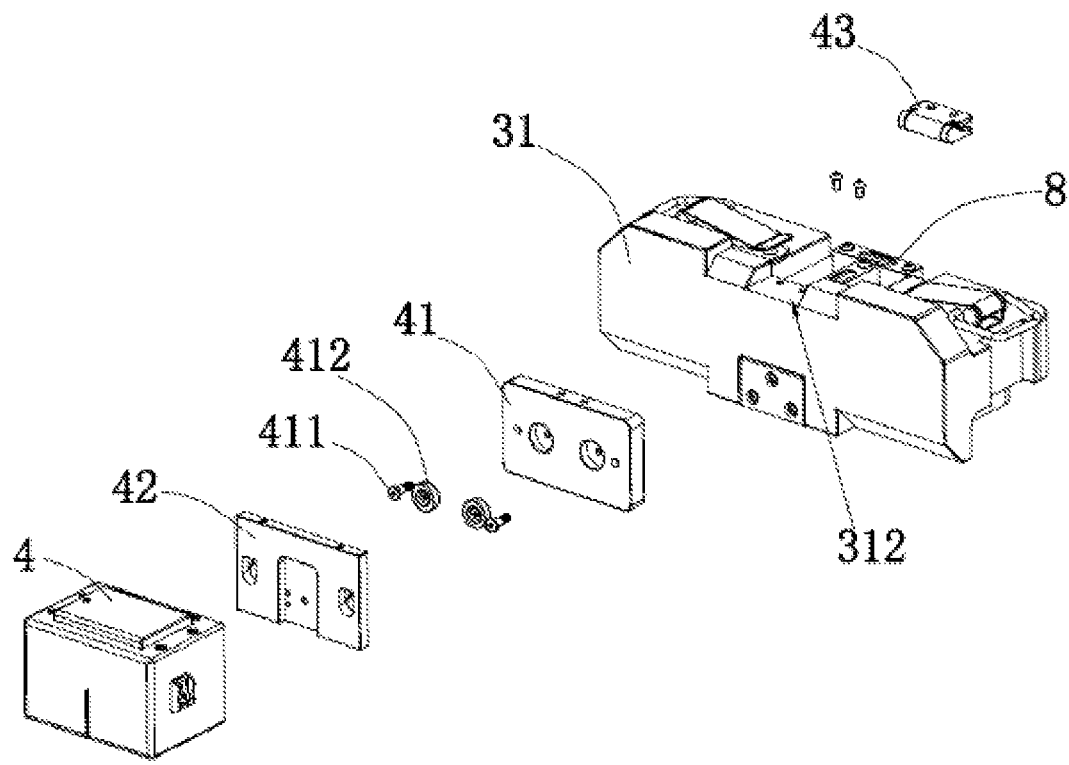
FIG. 20 is a schematic view of the exploded structure of the laser, the rotating plate and the mounting seat in a calibration device for a vehicle ADAS provided by an embodiment of the present disclosure.
Figure 21:
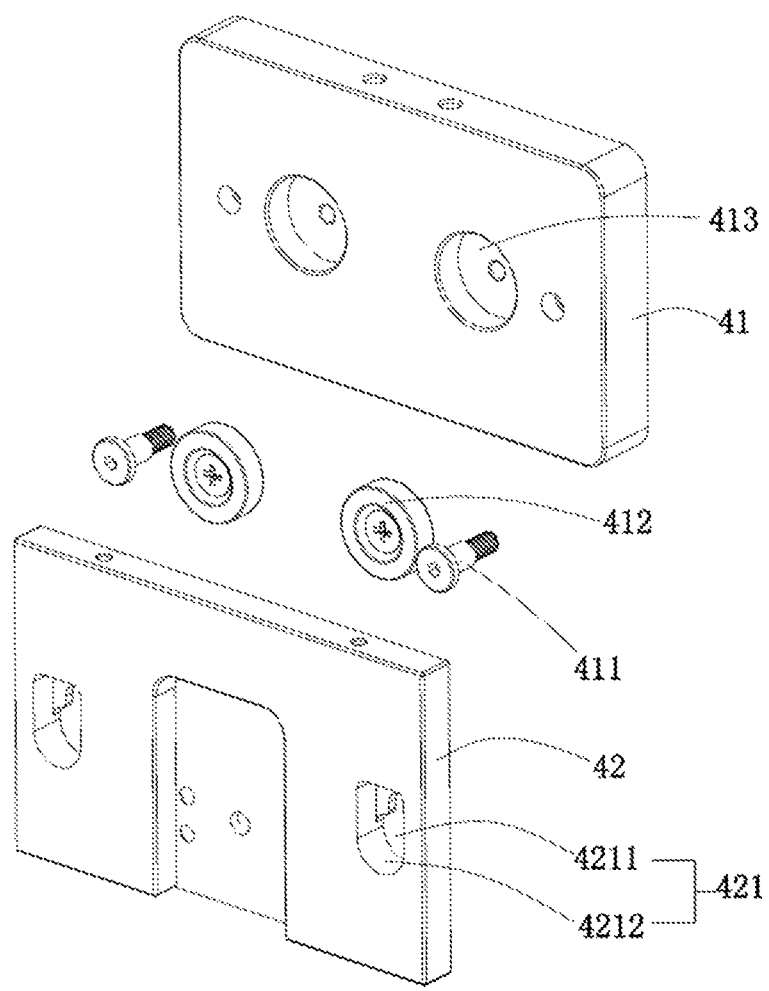
FIG. 21 is a schematic view of the structure of a rear plate and a rotatable plate in a calibration device for a vehicle ADAS provided by an embodiment of the present disclosure.
Figure 22:
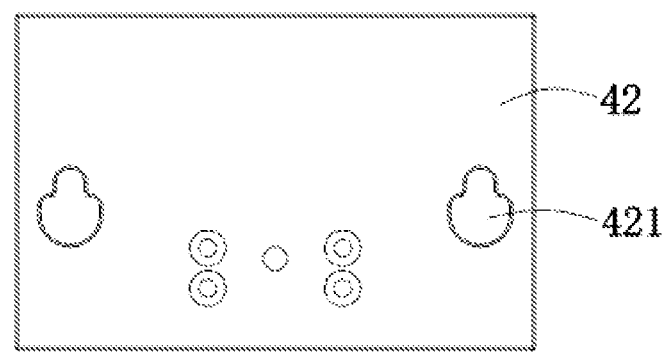
FIG. 22 is a schematic view of a planar structure of a rear plate in a calibration device for a vehicle ADAS provided by an embodiment of the present disclosure.

Specifically, as shown in FIGS. 20, 21 and 22, the top of the mounting seat 31 is provided with a first mounting hole, the top surface of the mounting plate 234 is provided with a second mounting hole, the hinge 43 is fixed to the first mounting hole and the second mounting hole by screws, and the rotatable plate 41 are arranged on the mounting seat 31 by the hinge 43. The hinge 43 includes two blades rotatably connected. One blade fits on the top of the mounting seat 31 through the screws and the first mounting hole, and the other blade fits on the top surface of the mounting plate 234 through the screw and the second mounting hole. The screw is provided with four, which are configured to ensure the firmness of installation of the hinge 43.

In the present embodiment, the hinge 43 is a damping hinge, that is, after the laser 4 is installed on the rotatable plate 41, and then rotatably arranged on the mounting seat 31 by the damping hinge. In this way, the rotatable plate 41 needs to be rotated under the action of external force. Thereby ensuring the stability of the position of the laser 4 and ensuring the accuracy of the laser 4 during detection.

As shown in FIGS. 20 to 22, a rear plate 42 is provided on the laser 4, and the laser 4 and the rear plate 42 are connected by screws. The rear plate 42 and the rotatable plate 41 are detachably connected. Specifically, the rear plate 42 is provided with a second connection hole 421, and the rotatable plate 41 is provided with a second connection member 411 configured to connect with the second connection hole 421. The laser 4 is detachably connected to the rotatable plate 41 by the second connection member 411 of the rotatable plate 41 being connected to the second connection hole 421 of the rear plate 42, thereby the installation and disassembly of the laser 4 is convenient.

As shown in FIGS. 20 to 22, the side of the rotatable plate 41 adjacent to the rear plate 42 is provided with a counter bore 413, and the counter bore 413 is provided with a second magnet 412 that attracts the rear plate 42. The second magnet 412 is fixed in the counter bore 413 by screws, and the counter bore 413 is configured to ensure that the surface of the rotatable plate 41 is flat, so as to prevent the second magnet 412 from affecting the installation of the rear plate 42. In the present embodiment, the rotatable plate 41 and the rear plate 42 are made of steel materials, so that the second magnet 412 in the rotatable plate 41 can attract the rear plate 42 to further ensure firmness of the attachment between the rear plate 42 and the rotatable plate 41.

As shown in FIGS. 20 to 22, the second connection hole 421 and the above first connection hole have the same structure, the second connection member 411 and the first connection member 334 are also T-shaped members having a T-shaped vertical section, the T-shaped member includes a connection rod and a limiting cap, and the T-shaped member is preferably a screw. That is, the connection rod is equivalent to the smooth section and the threaded section of the screw, the limiting cap is equivalent to the nut of the screw, and the specific structure of the screw has been described in the above embodiment 5, and the description is not repeated herein.

As shown in FIG. 21, in the present embodiment, the second connection hole 421 includes a receiving groove 4212 opened on the rear plate 42 and a limiting connection hole 4211 communicated with the receiving groove 4212, a cross-sectional area of the receiving groove 4212 is greater than that of the limiting connection hole 4211, and the limiting connection hole 4211 is arranged adjacent to the rotatable plate 41. The receiving groove 4212 is configured for receiving the limiting cap. The limiting connection hole 4211 is preferably a gourd hole. That is, the limiting connection hole 4211 includes a large round hole and a small round hole that communicate with each other. The limiting cap can be fixed in the receiving groove through the limiting connection hole 4211. Specifically, when the second connection member 411 is a screw, the diameter of the nut is smaller than that of the large round hole and greater than that of the small round hole, so that the nut can be inserted into the receiving groove 4212 through the large round hole, and then the smooth section of the screw is engaged with the small round hole to prevent the nut from detaching from the small round hole, which ensures the connection stability of the second connection member 334 and the second connection hole 421.

As shown in FIGS. 20 to 22, an escape groove 312 is provided on the top of the mounting seat 31, and the unfolded hinge 43 can be received in the escape groove 312. In this way, after turning over, the rotatable plate 41 and the laser 4 can be placed horizontally on the top of the mounting seat 31 to ensure the stability of the laser 4 after turning over on the top of the mounting seat 31. Specifically, the top shape of the mounting seat 31 can be set to match the top shape of the laser 4, which is beneficial to protect the laser 4.

Embodiment 7

In the present embodiment, on the basis of the foregoing embodiments 1-6, the use method and state of the calibration device for the vehicle ADAS are described in detail.

As shown in FIG. 1, the calibration device is in an unfolded state, at this time, the calibration device can be used for calibration. As shown in FIG. 2, the vehicle ADAS calibration device is in a folded storage state, at this time, the entire calibration device occupies a smaller space and is convenient to carry.

When the calibration device is required to perform the calibration work, the bearing arms 12 of the folding base are forced to be in the unfolded state and the beam 32 in the unfolded state, as shown in FIG. 1.

According to the calibration requirements, a small target plate is installed, as shown in FIG. 1, or a large target plate is installed, as shown in FIG. 12. Before installing the large target plate, you need to position the calibration device, and turn over the laser 4 180° by the rotatable plate 41, so that the laser 4 does not affect the installation of the large target plate.

According to the calibration requirements, the position adjustment and positioning of the calibration device are realized through the brake-type universal wheels, so that the laser 4 is aligned with axis of the vehicle. In the process of position adjustment, the height adjusting member 7 is used to enable the calibration device to overcome obstacles and adjust the levelness of the calibration device. The levelness is determined by observing the gradienter 8.

According to the calibration requirements, the inner column 23 is lifted through the transmission member 25 and the drive member 26 to change the height of the target plate 5. When the target plate 5 is a small target plate, the position of the small target plate on the beam 32 can be achieved by sliding the fixing block 33, and the specific value of the sliding of the fixing block 33 can be determined by the scale line on the beam 32. Of course, other calibration operations are existing calibration requirements and will not be introduced in detail herein.

The aforementioned embodiments are only optional embodiments of the present disclosure, and should not be regarded as being limitation to the present disclosure. Any modification, equivalent replacement, improvement, and so on, which are made within the spirit and the principle of the present disclosure, should be included in the protection scope of the present disclosure.

What is claimed is:

1. A calibration device for a vehicle Advanced Driver Assistant System, comprising:
 a foldable base, comprising a bearing seat and a plurality of bearing arms rotatably arranged on the bearing seat;
 a stand assembly, disposed on the bearing seat, wherein the bearing arms are able to be folded relative to the bearing seat in a direction approaching the stand assembly;
 a beam assembly, disposed on a top of the stand assembly and comprising two foldable beams; and
 a locking assembly, configured to limit folding angle of a first bearing arm of the bearing arms and is provided at a joint between the first bearing arm and the bearing seat, the locking assembly comprises a first locking hole and a second locking hole that are disposed on the bearing seat, and a locking member disposed on the first bearing arm, the first bearing arm extends in a horizontal direction when the locking member is in the first locking hole, and the first bearing arm extends in a vertical direction when the locking member is in the second locking hole,
 wherein the bearing seat comprises a bearing plate and baffles surrounding the bearing plate, and the baffles are provided with three and are distributed in a triangle shape, with a gap between same ends of each two adjacent baffles, and one end of the first bearing arm is rotatably disposed in the gap by a first rotating shaft, the first locking hole is a first groove formed on the baffles, and the second locking hole is a second groove formed on the baffles, and an opening of the first groove faces towards a horizontal direction, an opening of the second groove faces towards a vertical direction, and the locking member is a locking rod slidably disposed on the first bearing arm and respectively engaged with the first groove and the second groove, and the locking member is elastically connected with the first rotating shaft.

2. The calibration device of claim 1, wherein the first bearing arm is provided with a sliding slot, and the sliding slot is slidably provided with a second rotating shaft providing with a sliding handle, the locking rod is disposed on the sliding handle, and the sliding handle is able to drive the locking rod to be locked into or out of the first groove and the second groove under an action of external force.

3. The calibration device of claim 2, wherein the locking assembly further comprises an elastic reset member, and the elastic reset member drives the locking rod to be locked into the first groove or the second groove under a natural state.

4. The calibration device of claim 1, wherein an end of the first bearing arm away from the bearing seat is provided with a traveling wheel and a height adjusting member, and the height adjusting member being a knob screw, the traveling wheel being a brake-type universal wheel, the knob screw is threadedly connected with the first bearing arm and an end of the knob screw is rotatably disposed onto the brake-type universal wheel, and the other end of the knob screw is provided with a knob handle.

5. The calibration device of claim 1, wherein the stand assembly comprises:
   a fixing seat, disposed on the bearing seat;
   an outer column, with an end fixed onto the fixing seat;
   an inner column, movably inserted into the outer column, and there is a gap between an inner wall of the outer column and an outer wall of the inner column;
   a limiting ring, disposed at an end of the outer column away from the fixing seat, wherein the limiting ring is provided with a first engagement portion, and the inner column is provided with a second engagement portion configured for engaging with the first engagement portion, and the second engagement portion is only able to slide back and forth along a length direction of the outer column relative to the first engagement portion;
   a transmission member, disposed at the inner column and flush with an outer surface of the inner column or recessed on the outer surface of the inner column; and
   a drive member, disposed at the outer column and in transmission connection with the transmission member, wherein the drive member is configured for driving the inner column to lift.

6. The calibration device of claim 5, wherein the outer column is an outer cylinder, and the inner column is an inner cylinder, or cross sections of the outer column and the inner column are both regular polygons.

7. The calibration device of claim 6, wherein the first engagement portion is a protrusion radially projecting on an inner wall of the limiting ring, the second engagement portion is a groove disposed on the inner column and slidably engaged with the protrusion, a length direction of the groove is the same as that of the inner column, an end of the outer column away from the fixing seat is provided with a notch configured for the protrusion to be inserted in, and the limiting ring is fixed onto the outer column by a fastener.

8. The calibration device of claim 7, wherein a surface of an end of the inner column inserted into the outer column is provided with a plurality of limiting rods, and the plurality of limiting rods are arranged at an equal arc interval around an axis of the inner column, and an end surface of each limiting rod is in contact with an inner wall of the outer column, a part of the limiting rods abut against corresponding protrusions to stop the inner column from rising when the limiting rods rise to the limiting ring along with the inner column.

9. The calibration device of claim 8, wherein the drive member comprises:
   a box body, fixed on the outer column;
   a third rotating shaft and a fourth rotating shaft that are rotatably arranged in the box body;
   a turbine and a first transmission wheel that are arranged on the third rotating shaft;
   a second transmission wheel meshed with the first transmission wheel and a driving wheel meshed with the transmission member that are arranged on the fourth rotating shaft;
   a worm rotatably arranged on the box body and in self-locking meshed with the turbine; and
   an operating handle, disposed outside the box body and configured to drive the worm to rotate;
   wherein the outer column is provided with a slot configured for a part of the driving wheel extending into the outer column and meshing with the transmission member.

10. The calibration device of claim 1, wherein the beam assembly comprises:
    a mounting seat, disposed onto a top of the stand assembly;
    two beams, symmetrically arranged on both sides of the mounting seat, and the two beams being straight when unfolded;
    a fixing block arranged on each of the beams, the fixing blocks being slidably arranged on the beams, each of the fixing blocks being able to individually fix a first target plate, and wherein the beam is provided with a scale line for positioning a position of the fixing block; and
    a supporting rod, disposed on the mounting seat, a length direction of the supporting rod being perpendicular to a length direction of the beam, and the supporting rod being located on a symmetry line of the two beams; wherein the supporting rod is configured to hold a lower edge of a second target plate that is larger than the first target plate, and the two fixing blocks are configured to clamp the two side edges of the second target plate.

11. The calibration device of claim 10, wherein an end of the supporting rod is fixed to the mounting seat, and the other end of the supporting rod is provided with a cross rod perpendicular to a length direction of the supporting rod, the cross rod being parallel to the beam, and wherein the cross rod is provided with at least two supporting members spaced apart and configured to hold lower edge of the second target plate.

12. The calibration device of claim 11, wherein a side surface of the fixing block configured for installing the first target plate is concavely provided with a first magnet configured for attracting the first target plate and is convexly provided with a first connection member configured for connecting the first target plate.

13. The calibration device of claim 12, wherein the mounting seat is provided with a laser, wherein the laser is provided with a rear plate, the mounting seat is provided with a rotatable plate, and the rear plate is disposed onto the rotatable plate such that the laser is rotatably disposed onto the mounting seat.

14. The calibration device of claim 13, wherein the rotatable plate is arranged on the mounting seat through a damping hinge.

15. The calibration device of claim 13, wherein the rear plate is detachably arranged on the rotatable plate.

16. The calibration device of claim 15, wherein the rear plate is provided with a second connection hole, the mounting plate is concavely provide with a second magnet configured for attracting the rear plate and is convexly provided with a second connection member configured to connecting into the second connection hole.

17. The calibration device of claim 16, wherein the second connection hole is provided with a receiving groove and a limiting hole communicated with the receiving groove, a cross-sectional area of the receiving groove is larger than that of the limiting hole, and the limiting hole is disposed adjacent to the rotatable plate; the second connection member comprises a connection rod and a limiting cap, and the limiting cap being fixed into the receiving groove through the limiting hole.

* * * * *